(12) United States Patent
Landgraf et al.

(10) Patent No.: US 12,527,460 B2
(45) Date of Patent: Jan. 20, 2026

(54) ENDOSCOPIC IMAGING AND CONTROL SYSTEM

(71) Applicant: Meditrina, Inc., San Jose, CA (US)

(72) Inventors: Nicholas Landgraf, Huntington Woods, MI (US); Kyle Fast, San Jose, CA (US)

(73) Assignee: Meditrina, Inc., San Jose, CA (US)

( * ) Notice: Subject to any disclaimer, the term of this patent is extended or adjusted under 35 U.S.C. 154(b) by 279 days.

(21) Appl. No.: 18/328,565

(22) Filed: Jun. 2, 2023

(65) Prior Publication Data

US 2023/0397798 A1 Dec. 14, 2023

Related U.S. Application Data

(63) Continuation-in-part of application No. 18/050,132, filed on Oct. 27, 2022.

(60) Provisional application No. 63/263,129, filed on Oct. 27, 2021.

(51) Int. Cl.
| | |
|---|---|
| *A61B 1/00* | (2006.01) |
| *A61B 1/04* | (2006.01) |
| *A61B 1/045* | (2006.01) |
| *A61B 1/06* | (2006.01) |
| *A61B 1/12* | (2006.01) |

(52) U.S. Cl.
CPC .......... *A61B 1/00126* (2013.01); *A61B 1/042* (2013.01); *A61B 1/045* (2013.01); *A61B 1/0684* (2013.01); *A61B 1/128* (2013.01)

(58) Field of Classification Search
CPC ............ A61B 1/00066; A61B 1/00133; A61B 1/00188; A61B 1/00195; A61B 1/00197; A61B 1/0016; A61B 1/042
USPC .......................................................... 600/112
See application file for complete search history.

(56) References Cited

U.S. PATENT DOCUMENTS

| | | | |
|---|---|---|---|
| 5,443,057 A | 8/1995 | Elmore | |
| 5,621,830 A | 4/1997 | Lucey et al. | |
| 6,030,339 A | 2/2000 | Tatsuno et al. | |
| 6,292,221 B1 * | 9/2001 | Lichtman | G02B 23/2484 359/823 |
| 7,387,605 B2 | 6/2008 | Frith | |
| 12,295,542 B2 | 5/2025 | Truckai et al. | |
| 2002/0067411 A1 * | 6/2002 | Thompson | H04N 23/66 348/E5.025 |
| 2002/0161280 A1 | 10/2002 | Chatenever et al. | |
| 2004/0267089 A1 * | 12/2004 | Otsuka | A61B 1/00188 600/102 |
| 2005/0228230 A1 | 10/2005 | Schara et al. | |
| 2005/0267329 A1 * | 12/2005 | Konstorum | A61B 1/00105 600/167 |
| 2006/0167342 A1 * | 7/2006 | Bob | A61B 1/0053 600/137 |
| 2006/0206003 A1 * | 9/2006 | Hoeg | A61B 1/00163 600/117 |
| 2007/0249899 A1 | 10/2007 | Seifert | |

(Continued)

FOREIGN PATENT DOCUMENTS

WO   WO 2017/040692   3/2017

*Primary Examiner* — Michael J Carey
*Assistant Examiner* — Stephen Floyd London
(74) *Attorney, Agent, or Firm* — Levine Bagade Han LLP

(57) ABSTRACT

Endoscopic viewing systems for use in diagnostic and therapeutic medical procedures. More specifically, an imaging and control system and coupler that allows for control of imaging and fluid management from a hand-held unit coupled to a conventional multiple-use, sterilizable endoscope.

11 Claims, 20 Drawing Sheets

(56) References Cited

U.S. PATENT DOCUMENTS

| | | | |
|---|---|---|---|
| 2007/0265499 A1* | 11/2007 | Wood | A61B 1/00183 600/137 |
| 2008/0119695 A1* | 5/2008 | Ueno | A61B 1/0016 600/152 |
| 2008/0249365 A1* | 10/2008 | Masaki | A61B 1/0016 600/152 |
| 2009/0247825 A1 | 10/2009 | Tanahashi et al. | |
| 2010/0022829 A1 | 1/2010 | Irion et al. | |
| 2010/0105980 A1* | 4/2010 | Shimizu | A61B 1/00096 600/101 |
| 2010/0145146 A1 | 6/2010 | Melder | |
| 2011/0098530 A1* | 4/2011 | Yamane | A61B 1/042 600/109 |
| 2011/0288374 A1* | 11/2011 | Hadani | A61B 1/00172 600/113 |
| 2012/0202385 A1 | 8/2012 | Miyagi et al. | |
| 2014/0066701 A1 | 3/2014 | Wilson et al. | |
| 2014/0275780 A1 | 9/2014 | Feingold et al. | |
| 2014/0285644 A1 | 9/2014 | Richardson et al. | |
| 2015/0105620 A1* | 4/2015 | Oginski | G02B 23/2453 600/112 |
| 2015/0196197 A1 | 7/2015 | Kienzle et al. | |
| 2017/0215721 A1 | 8/2017 | Harrah et al. | |
| 2018/0132700 A1 | 5/2018 | Ouyang et al. | |
| 2019/0305474 A1 | 10/2019 | Sato et al. | |
| 2019/0310681 A1 | 10/2019 | Shainwald et al. | |
| 2020/0170486 A1 | 6/2020 | Mattes et al. | |
| 2020/0187758 A1 | 6/2020 | Duckett, III et al. | |
| 2020/0397232 A1 | 12/2020 | Ulmschneider et al. | |
| 2021/0100431 A1 | 4/2021 | Shainwald | |
| 2021/0127948 A1 | 5/2021 | Pang et al. | |
| 2021/0219816 A1 | 7/2021 | Truckai et al. | |
| 2023/0076439 A1 | 3/2023 | Zhang | |
| 2023/0128846 A1 | 4/2023 | Landgraf et al. | |
| 2024/0180393 A1 | 6/2024 | Truckai et al. | |
| 2024/0216089 A1* | 7/2024 | Niikawa | A61B 34/25 |

* cited by examiner

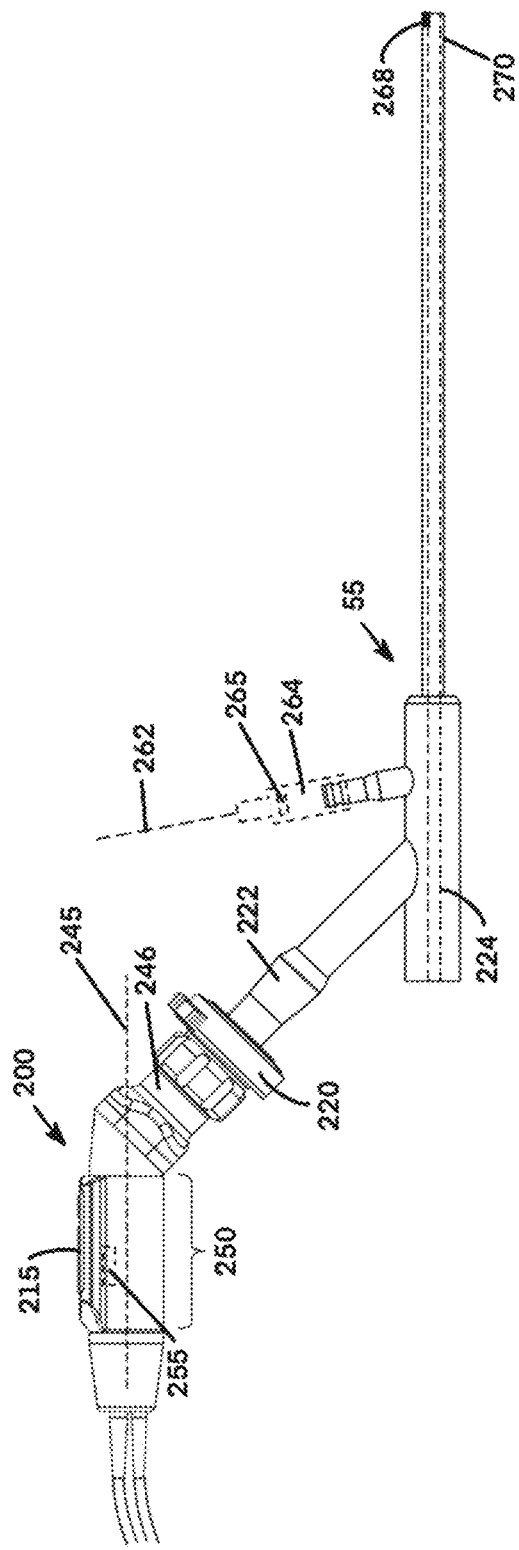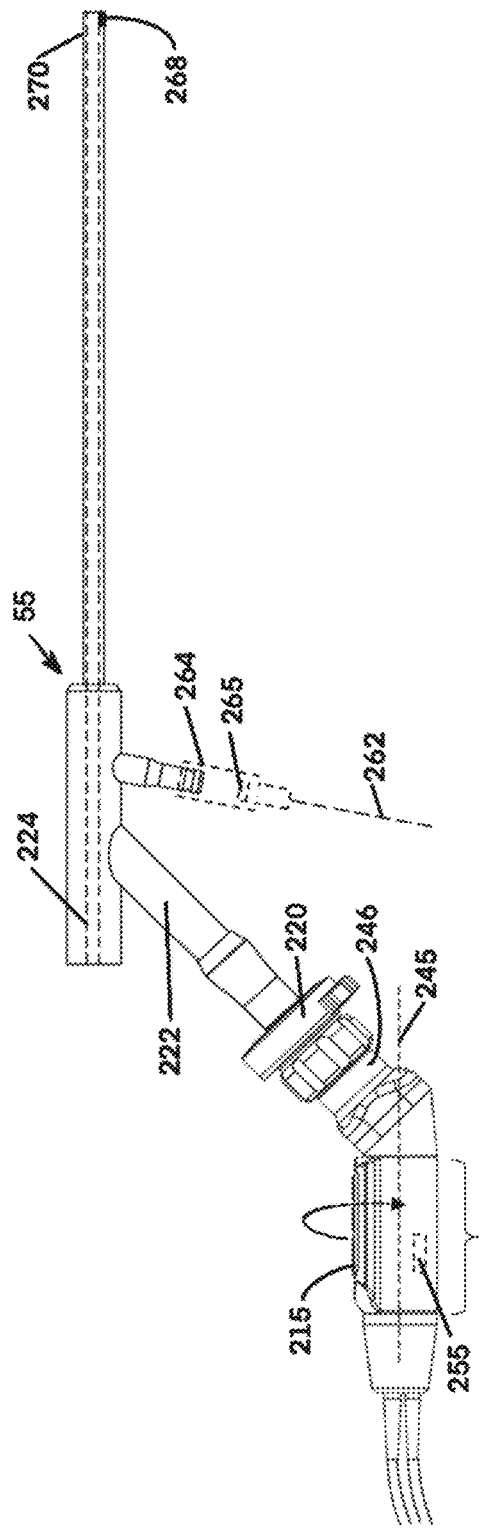
FIG. 6A
FIG. 6B

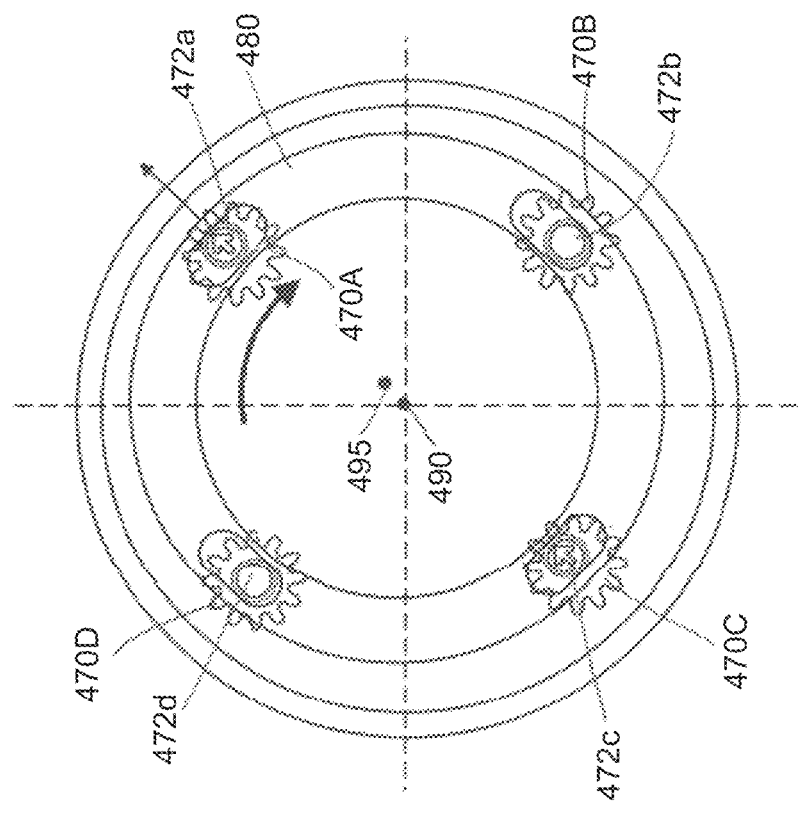
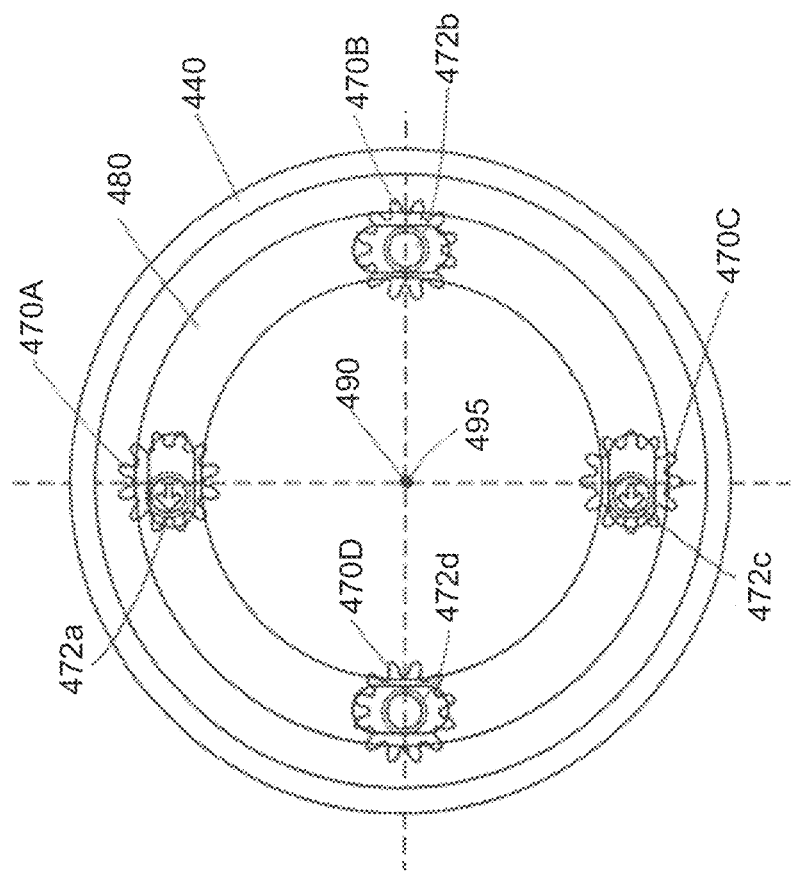

ENDOSCOPIC IMAGING AND CONTROL SYSTEM

RELATED APPLICATIONS

This application is related to U.S. application Ser. No. 17/150,970 filed on Jan. 15, 2021, and is a continuation-in-part of U.S. application Ser. No. 18/050,132 filed on Oct. 27, 2022, which claims priority to U.S. Provisional Application No. 63/263,129 filed on Oct. 27, 2021, the entirety of each of which are incorporated herein by reference.

FIELD OF THE INVENTION

The present invention generally relates to endoscopic viewing systems for use in diagnostic and therapeutic medical procedures. More specifically, the invention relates to an imaging and control system and coupler that allows for control of imaging, lighting, and fluid management from a hand-held unit coupled to a conventional multiple-use, sterilizable endoscope.

SUMMARY OF THE INVENTION

The present disclosure includes endoscopic systems. For example, such a system can include a handle with a rotatable C-mount optical coupler assembly for coupling to a proximal end of an endoscope, an image sensor carried by the rotatable C-mount optical coupler assembly; and at least one of an accelerometer and a gyroscope carried by the rotatable C-mount optical coupler assembly.

Variations of the system can include a controller and an image processor coupled to the image sensor and the at least one the accelerometer or the gyroscope; and a controller algorithm adapted to acquire signals from the at least one accelerometer or gyroscope caused by rotation of the C-mount optical coupler and thereafter rotate a displayed image in response to the signals to correct an orientation of the displayed image to a selected configuration.

The endoscopic system can further comprise electrical leads extending from the image sensor to a fixed location in the handle, wherein the electrical leads are configured with a slack portion in an interior of the handle to accommodate rotation of rotatable C-mount optical coupler assembly therein. The electrical leads can optionally extend from the at least one of the accelerometer or the gyroscope to a fixed location in the handle, wherein the electrical leads are configured with a slack portion in an interior of the handle to accommodate rotation of rotatable C-mount coupler assembly therein.

Variations of the system can include a rotatable C-mount coupler assembly that is configured to rotate at least 90° in each direction about its axis in the handle. In additional variations, the rotatable C-mount coupler assembly can rotate at least 180° in each direction about its axis in the handle.

Additional variations of the system include a continuously rotatable C-Mount coupler assembly where the internal connection between the C-Mount coupler assembly and handle is mediated by ballpoint pogo pins and a loop with traces. In such a variation, there is no fixed connection but rather continuous sliding contact and connection between the pogo pins and the loop.

Additional variations of the system include a fluid management system controlled by the controller and at least one actuator in the handle for adjusting operating parameters of the fluid management system. The controller can also include algorithms for operating a fluid inflow source and a negative pressure source of the fluid management system to maintain fluid pressure in a working space within a set pressure range.

Additional variations of the system can further comprise a light source adapted for coupling to the endoscope. The light source may have fixed parameters or at least one actuator in the handle and or system for adjusting operating parameters of the light source.

The endoscopic system can further include at least one actuator in the handle for operating the image sensor to capture images or videos or adjust auto white balance (AWB).

An additional variation of an endoscopic system can include a handle with a rotatable C-mount optical coupler assembly for coupling to a proximal end of an endoscope; an image sensor carried by the rotatable C-mount optical coupler assembly; at least one of an accelerometer and a gyroscope carried by the rotatable C-mount optical coupler assembly; and a controller and image processor coupled to the image sensor and the at least one of the accelerometer or the gyroscope, wherein a controller algorithm is adapted to acquire signals from the at least one of the accelerometer or the gyroscope caused by rotation of the C-mount optical coupler and thereafter rotate a displayed image in response to the signals to correct an orientation of the displayed image to a selected configuration.

The present disclosure also includes methods for orienting an endoscope image on a display. For example, such a method can include providing a C-mount optical coupler carrying an image sensor for displaying an image on a display, wherein the C-mount optical coupler carries at least one of an accelerometer and gyroscope carried by the C-mount optical coupler; attaching the C-mount optical coupler to an endoscope; acquiring signals from at least one of the accelerometer and the gyroscope caused by rotation of the C-mount optical coupler; and rotating the image on the display in response to the signals to correct an orientation to a selected configuration.

Variations of the method also include a C-mount optical coupler that is rotatably disposed in a handle member. Additional variations of the method include rotating the C-mount optical coupler and manipulating the image electronically.

BRIEF DESCRIPTION OF THE DRAWINGS

Additional aspects of the invention will become clear from the following description of illustrative embodiments and from the attached drawings, in which:

FIG. 6A is a side elevation view of the handle component of FIG. 5 in a first position with the rotating control pad portion of the handle in an upright or superior position suited for actuation with the physician's thumb.

FIG. 6B is a side elevation view of the handle component and endoscope of FIG. 6A rotated 180° from the position of FIG. 6A, where the control pad portion of the handle is maintained in an upright or superior position suited for actuation with the physician's thumb.

FIG. 16A is an axis-transverse view of the four planet gears of the planetary gear set of FIGS. 12-14 with the gear posts received by elongate slots in an offset ring of the adjustment mechanism assembly of FIGS. 10 and 13 in a first position wherein the optical center of the offset ring is aligned with the optical axis of the image sensor.

FIG. 16B is an axis-transverse view similar to that of FIG. 16A where the four planet gears are rotated by the outer ring gear of FIG. 12, which causes the off-center posts of two eccentric planet gears to move the optical center of the offset ring out of alignment with the optical axis of the image sensor.

DETAILED DESCRIPTION OF THE INVENTION

Figure 1:
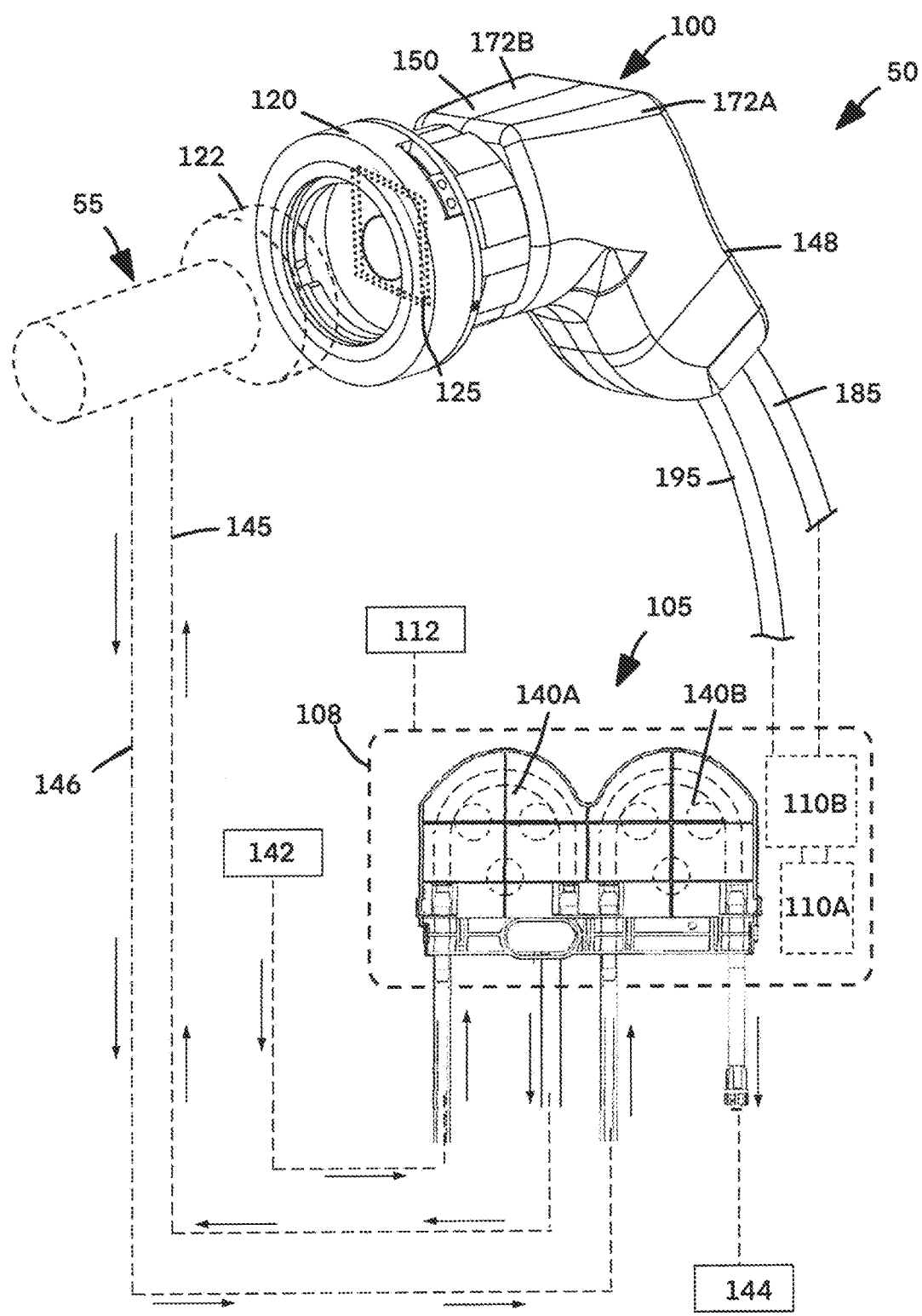
FIG. 1 illustrates components of an imaging system for hysteroscopic treatments corresponding to the invention, including a perspective view of a multi-functional handle component and a schematic view of a fluid management system.

FIG. 1 illustrates an imaging system 50 adapted for use with a conventional endoscope 55 to perform a hysteroscopic or endoscopic procedure corresponding to the invention, which comprises multiple components, including a handle component 100 and a fluid management system 105 housed in a base unit or console 108. The base unit 108 also carries a controller 110A and power source for operating the system 50 and can include an image processor 110B for processing signals from an image sensor carried by the system. A display 112 is coupled to the base unit 108 for viewing images provided by the system 50.

Figure 2:
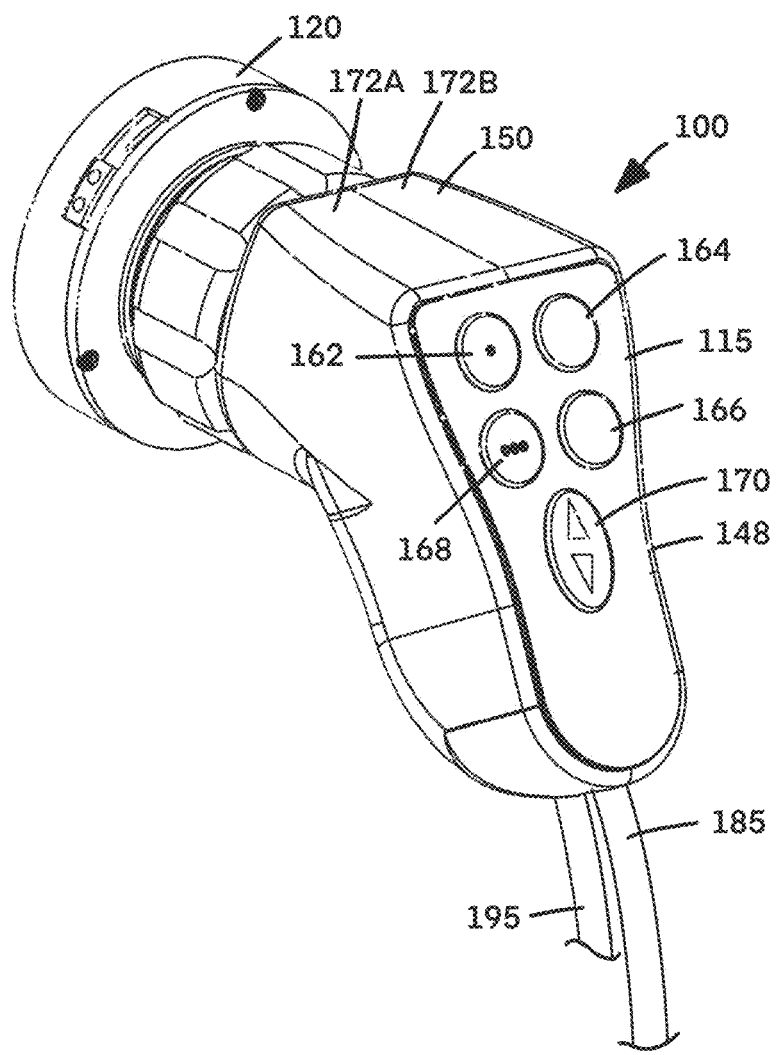
FIG. 2 is a perspective view of the handle component from a different angle.

More in particular, the handle component 100 of FIGS. 1 and 2 can comprise a single-use or multiple-use handle unit 100 with a finger-actuated control pad 115 (FIG. 2) for operating the controller 110A and the fluid management system 105. The handle component 100 has a distal end comprising a C-mount optical coupler portion 120 adapted for coupling to a proximal end 122 of a commercially available, multi-use, sterilizable endoscope 55. The term "C-mount optical coupler" is used herein to describe a "camera mount" as is known in the art. In this variation, the handle component 100 carries an electronic image sensor 125, as will be described further below (see FIGS. 1 and 3). Various latch mechanisms are known for latching the C-optical coupler portion 120 to the endoscope 55.

Referring to FIG. 1, the fluid management system 105 includes a first peristaltic inflow pump 140A and second peristaltic outflow pump 140B, a fluid source 142, and fluid collection reservoir 144, which can include a fluid deficit measurement subsystem as is known in the art. Inflow tubing 145 extends to the endoscope 55, which has a flow channel therein to deliver fluid inflows to the patient's body, such as a uterine cavity in a hysteroscopy. Outflow tubing 146 is shown coupled to the endoscope 55 but also may be coupled to a tool introduced through the endoscope, depending on the procedure. In any event, the fluid management system in endoscope operates as is known in the prior art.

Referring to FIGS. 1-4, it can be seen that the handle component 100 has a grip portion 148, which extends from an upper housing portion 150. A rotating assembly 155 is carried within the upper housing 150 wherein image sensor 125 and lens 127 are disposed in the interior of the rotating assembly 155.

The grip portion 148 includes a finger or thumb-actuated control pad 115 that carries actuator buttons for operating multiple functions of the system 50, for example, including (i) operating the fluid management system 105, (ii) capturing images or videos from the image sensor 125, (iii) adjusting light intensity from a light source coupled to (or carried by) the endoscope 55 (not shown). As described above, the control unit 108 typically carries the image processor 110B. However, the interior of the handle 100 also can carry the image processor 110B or a processing component thereof.

Figure 3:
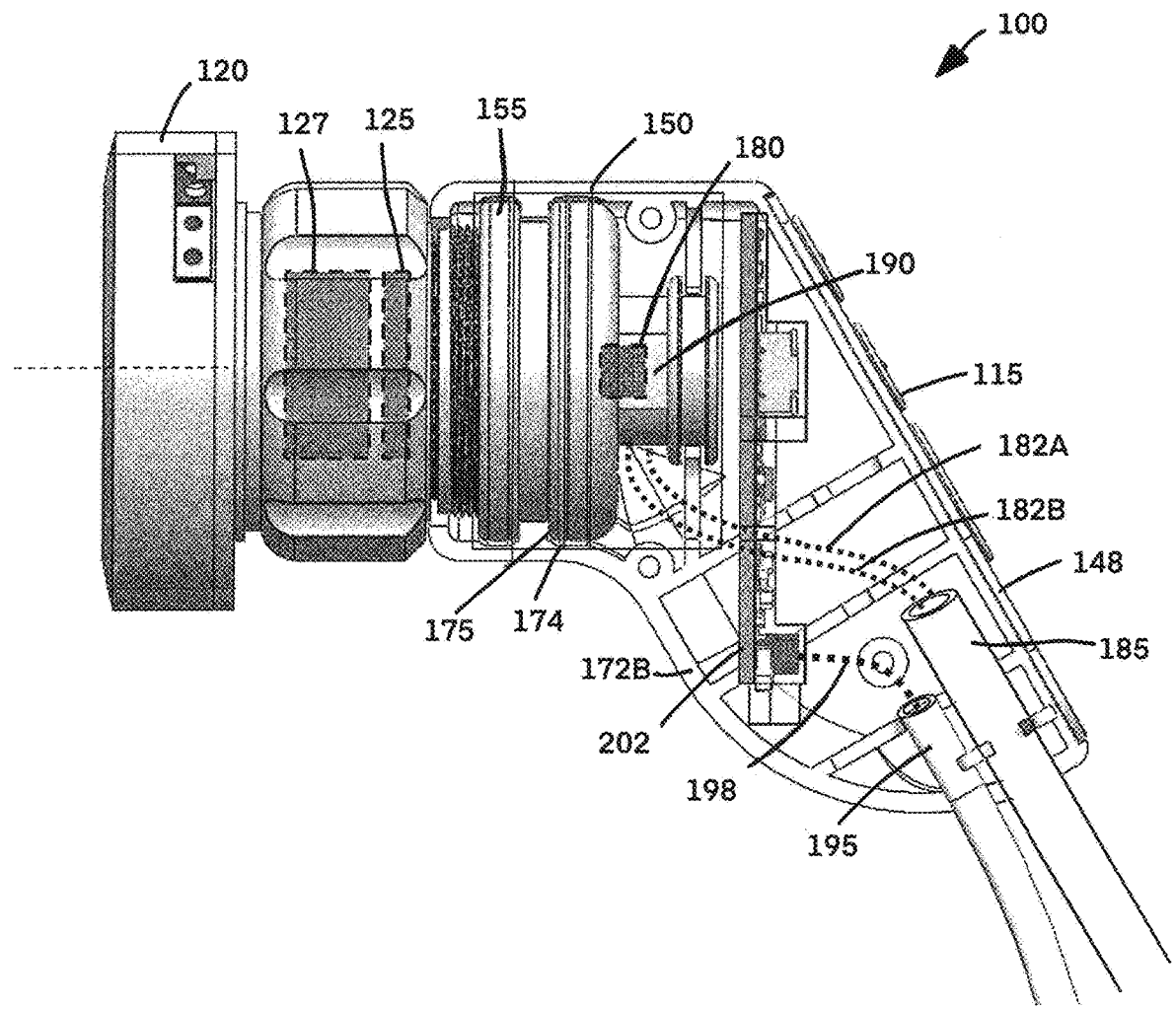
FIG. 3 is a side elevation view of the handle component of FIGS. 1-2 with a side of the handle shell removed to show a rotating assembly, and a circuit board carried within the handle component.
Figure 4:
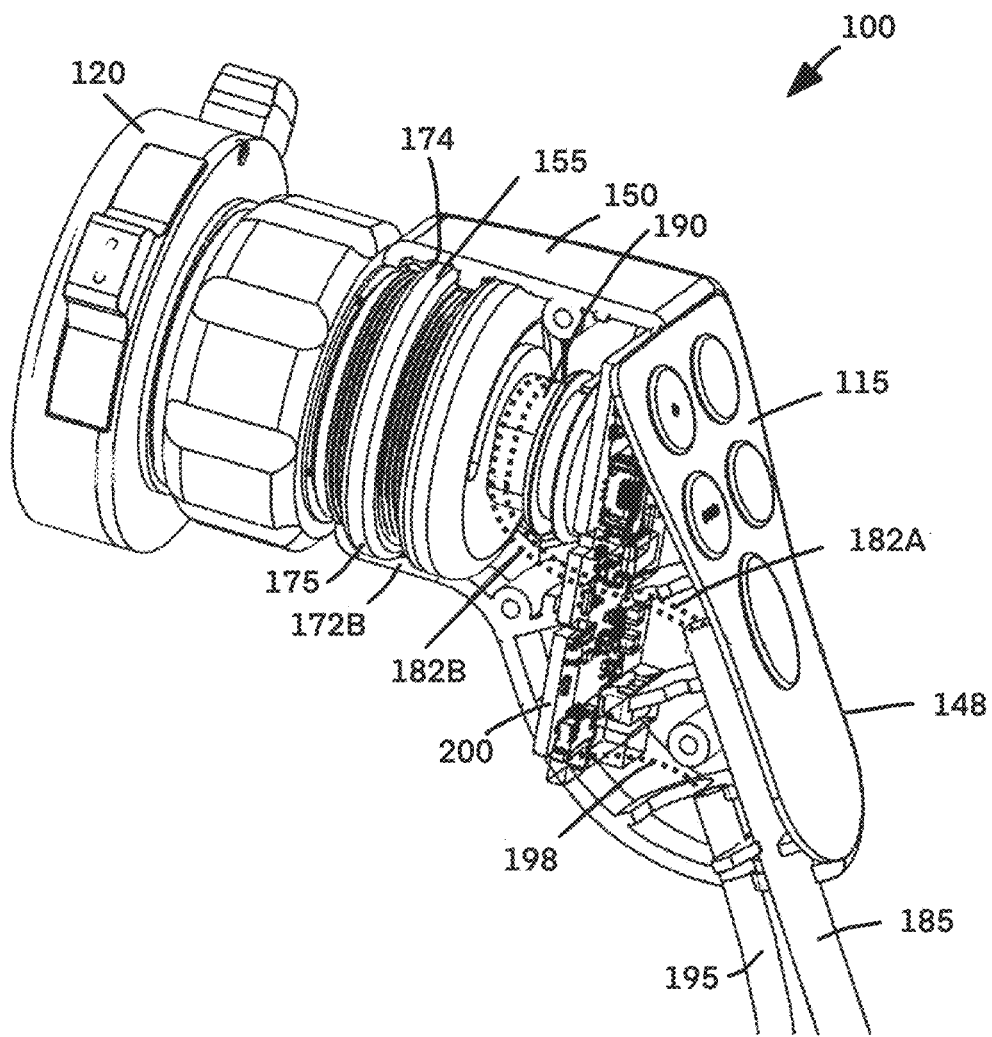
FIG. 4 is a perspective view of the endoscopic viewing system of FIG. 3 from a different angle illustrating the rotating shaft assembly and circuit board.

Referring to FIGS. 2-4, the view of the handle 100 shows the control pad 115 with a plurality of actuator buttons, with four actuator buttons or switches (162, 164, 166, 168) in a variation and one scrolling-actuator button 170, which are adapted to operate the system. In one variation, actuator 162 is adapted for turning on and off irrigation, or in other words actuating the fluid management system 105 to provide fluid inflow and fluid outflows. Actuator 164 is adapted for image or video capture. In a variation, momentary pressing the actuator 164 will capture a single image, and longer pressure on the actuator will operate a video recording. Actuator 166 is adapted for adjustment of light intensity. In one variation, actuator 168 is adapted for "flush", that is, providing a high flow rate through the inflow tubing as long as the button is depressed. In another variation, additional actuator button can be provided for adjusting white balance and for operating video recording.

The scrolling-actuator button 170 has a scrolling function, wherein pressing the scrolling button 170 will cycle through various subsystems. In one example, the scrolling button 162 can be actuated to cycle through the following subsystems and features: (i) fluid inflow/outflow rate from the fluid management system 105; (ii) the set pressure which is to be maintained by fluid management system 105; (iii) fluid deficit alarm which is calculated by the fluid management system 105; and (iv) optional selection of still image capture or video capture. Then, after scrolling to select a subsystem, the physician can push centrally on the actuator to adjust by toggling through or among operating parameters of the selected subsystem. In one variation, the selection of subsystems, as well as the real-time operating parameters of each subsystem, will be displayed on a video monitor or display 112, as shown in FIG. 1. Thus, it can be understood that the physician may operate the scrolling button 170 to scroll through and select any subsystem or feature while observing such as selection on the display 112, and then actuate the scrolling-actuator 170 to adjust an operating parameter which also can be observed on the display 112.

In another aspect of the invention, the controller 110A includes a control algorithm for operating the control pad 115, which provides a jump back to a default condition after the scrolling-actuator button 170 has been used by the physician. For example, the default condition will be a selected default subsystem, which is actuatable by the actuator 170. In one variation, the default subsystem is the fluid inflow/outflow rate, which may be the subsystem most commonly actuated by the physician to control fluid flow into and out of a working space. As described above, the physician may use the scrolling feature of button 170 to select any subsystem for adjustment of an operating parameter. If, however, the physician does not continue to scroll between the various subsystems or change a parameter within a predetermined time interval, then the control algorithm will jump back to the default subsystem, which may be the fluid inflow/outflow rate. The predetermined time interval, or timeout, for the control algorithm to jump back to the default condition may be anywhere from 1 second to 10 seconds, more often between 2 seconds and 5 seconds.

As can be understood from FIGS. 3 and 4, the handle 100 can consist of two injection-molded plastic shell elements, 172a and 172b (see FIG. 2). FIGS. 3 and 4 show one shell element 172a removed to show the interior of the handle 100. It can be seen that annular groove features 174 are provided that engage flanges 175 on rotating assembly 155 to allow for its rotation. The rotating assembly 155 also carries a 3 or 4 axis accelerometer 180 or gyroscope (see FIG. 3) in an interior region thereof, typically proximally spaced apart from the image sensor 125 and lens 127. In order to provide the large number of electrical leads required for the image sensor 125 and the accelerometer 180, two flex circuit ribbons 182A and 182B (dotted lines) are provided and carried within cable sheath 185 that extends away from handle 100. The distal end of the two flex circuit ribbons are connected to rotating assembly 155. Therefore, to allow for rotation of the rotating assembly 155, mechanisms are needed to accommodate the needed slack in the flex circuit ribbons 182A and 182B during rotation of the rotating assembly 155 relative to the upper housing 150 (FIGS. 3-4). As can be seen in FIGS. 3-4, the rotating assembly 155 includes a spool 190 around which the flex circuit ribbons 182A and 182B can be coiled or spooled. The spool 190 is formed as a part of the rotating assembly 155. A suitable length of flex circuit ribbons 182A and 182B is provided to allow for at least 90° rotation, or more often 180° or 360° of rotation of the rotating assembly 155 relative to the handle 100. In the variation shown in FIGS. 3-4, it can be seen that a single spool 190 is provided for receiving both flex circuit ribbons 182A and 182B, but it should be appreciated that two separate spools can be formed in the rotating assembly 155 adapted for receiving a slack length of each flex circuit ribbon 182A and 182B. In a specific example, the image sensor 125 can comprise a sensor from OmniVision, 4275 Burton Drive, Santa Clara, CA 95054, with the part name/number as follows: High-Definition Sensor OV9734 with a 1280×720 pixel count. The sensor 125 has package dimensions of 2532 μmm×1722 μmm, with a diagonal of approximately 3 mm. In this example, the flex circuit ribbons 182A and 182B are approximately 3.4 mm in width with a 0.2 mm thickness which allows it to spool easily on spool 190. In other variations, any suitable image sensor can be used, such as a 4K sensor. In another variation, an AR0521 CMOS digital image sensor can be used, which is manufactured by ONSEMI, Inc., 5701 N. Pima Rd, Scottsdale, AZ, 85250.

While the variation of FIGS. 3-4 shows the handle accommodating the flex circuit ribbons 182A and 182B in a spool (or spools). It should be appreciated that the slack portion of the flex circuit ribbons can be configured with at least one of a coiled form, spiral form, or folded form without one or more spools.

Referring again to FIGS. 3-4, a second cable 195 extends from the handle component 100 to the base unit 108, which carries electrical leads 198 (dotted line) from the controller 110A to circuit board 200 and thereafter to the actuator panel 115. The cable 195 carries a plurality of leads 198 for carrying signals to and from the actuator buttons and also for LEDs in the actuator panel and buttons.

Figure 5:
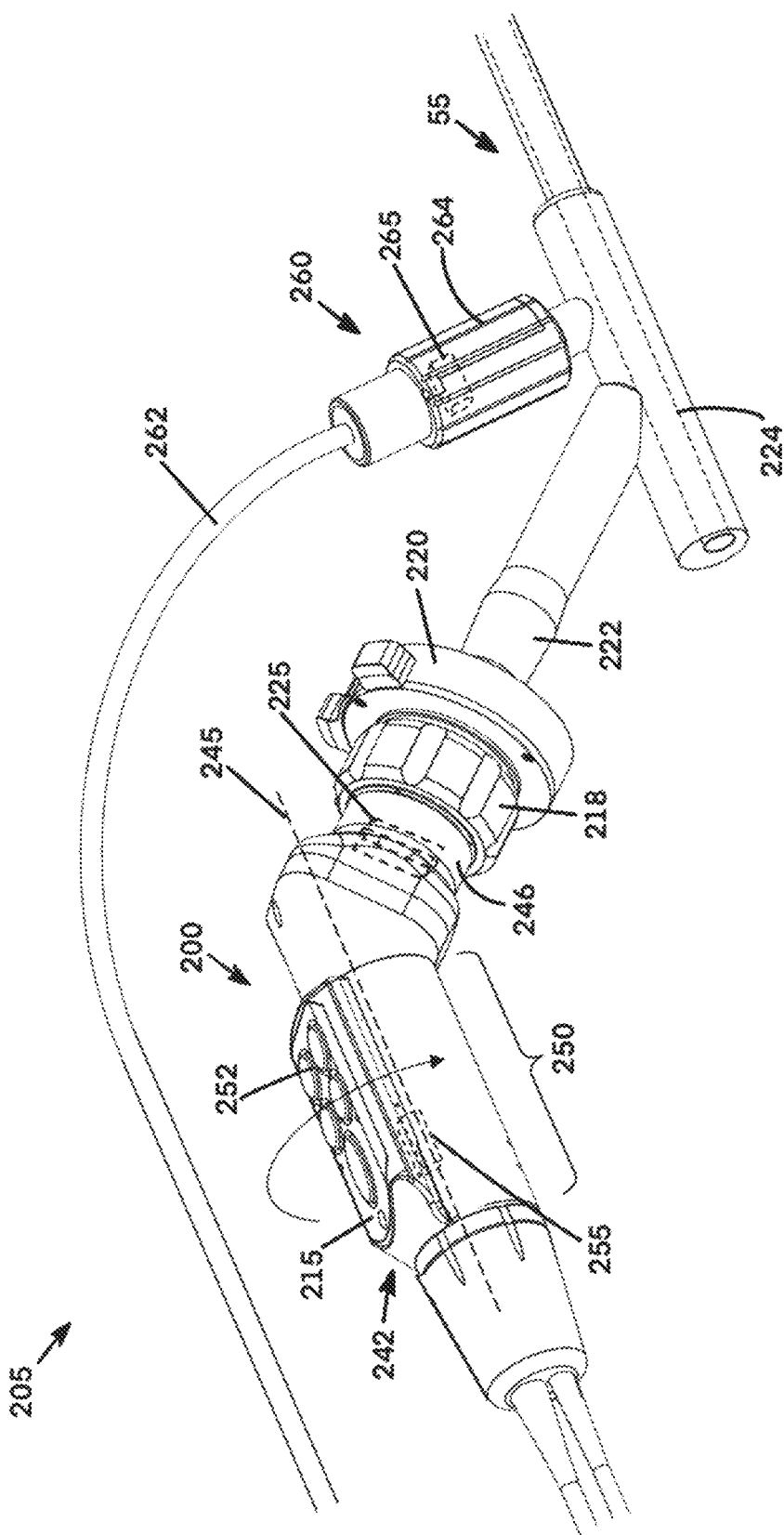
FIG. 5 is a perspective view of another variation of a multi-functional handle component that carries a first accelerometer and a light source housing that carries a second accelerometer and is adapted for coupling to an endoscope, wherein the wherein first and second accelerometers are coupled to a controller which is adapted to stabilize images on a video screen no matter the rotational orientation of the handle and the endoscope, and where a control pad portion of the handle is rotatable about the handle.

FIG. 5 illustrates another variation of a handle component 200 of an imaging system 205 for use with a fluid management system 105 and a base unit or console 108 as described above (FIG. 1). The system 205 again is configured for use with controller 110A and power source for operating the system together with an image processor 110B for processing signals from an image sensor carried by the system. A display 112 is coupled to the base unit 108 for viewing images from the system.

Referring to FIG. 5, the handle component 200 again can be adapted for single-use or multiple-use and carries a finger or thumb-actuated control pad 215 for operating the controller 110A and the fluid management system 105. The handle component 200 has a distal end 218 comprising a C-mount optical coupler portion 220 as described above for coupling to a proximal end or lens of an angled optics sleeve 222 of a commercially available endoscope 55 configured with a working channel 224 therein. In this variation, the handle component 200 again carries an electronic image sensor 225, as described above (FIG. 5).

In FIG. 5, it can be seen that the handle component 200 has an axial grip portion 242 extending generally about axis 245, which transitions to an angled portion 246 that carries the C-mount 220. The axial grip portion 242 includes the thumb-actuated control pad 215, which in this variation is mounted on a 360° rotatable sleeve 250 that is adapted to freely rotate around the axial grip portion 242. The control pad 215 again carries actuator buttons 252 for operating multiple functions of the system 205 as described above, for example, (i) operating the fluid management system 105, (ii) capturing images or videos from the image sensor 225, (iii) adjusting light intensity from a light source described below. The handle component 200 carries a first accelerometer 255, which is configured to send signals to the controller 110A indicating the rotational orientation of the handle component 200. The accelerometer 255 is carried in an interior non-rotating portion of the handle component 200.

Still referring to FIG. 5, the system 205 also comprises a light source 260 with cable 262 for coupling to the endoscope 55, wherein the light source connector 264 carries a second accelerometer 265. The light source typically comprises an LED within the connector 264 (not shown). The accelerometer 265 carried by the light source connector 264 again is connected to the controller 110A to provide signals indicating the rotational orientation of the connector 264 and endoscope 55 to allow control algorithms of the controller 110A to stabilize a video image in an upright orientation on the video display.

Now turning to FIG. 6A, the endoscope 55 is shown in a first position with its angled optics sleeve 222 in a superior position with the handle component 200 attached to the optics sleeve with the C-mount optical coupler 220 as shown in FIG. 1. In FIG. 6A, the rotatable control pad 215 is also in a superior or upright position as would be suitable for gripping by a physician's hand for thumb actuation of buttons 252 on the control pad 215. Similarly, the light source connector 264 is in a superior position. FIG. 6B shows the assembly of components of FIG. 6A rotated 180° as would be the case when the physician rotates the assembly to re-orient the endoscope lens 268 and working channel 224 at the distal tip 270 of the endoscope 55 to view the working end of a tool in a working space (not shown). In FIG. 6B, it can be seen that the control pad 215 is rotated around the axial grip portion 242 of the handle 200 so that the control pad 215 is maintained in the same superior position as in FIG. 6A, which is then suited for use and actuation of control buttons 252 by the physician.

With reference to FIGS. 5 and 6A-6B, it can be seen that no matter the rotational orientation of assembly of the handle 200, the endoscope 55, and the light source connector 264, signals from either the first accelerometer 255 or the second accelerometer 265 to the controller 110A can provide rotational orientation data of the components so that the image stabilization algorithms of the controller 110A can maintain a video image on the video display in an upright or locked position. In one variation, the use of first and second accelerometers 255, 265 allows for redundancy so that the controller 110A can confirm the accuracy of signals from both accelerometers. In another variation, the use of first and second accelerometers 255, 265 can be adapted for image stabilization when other ranges of motion among the components can occur, for example, when the C-mount optical coupler 220 is rotated around the optics sleeve 222 on purpose or inadvertently.

Figure 7:
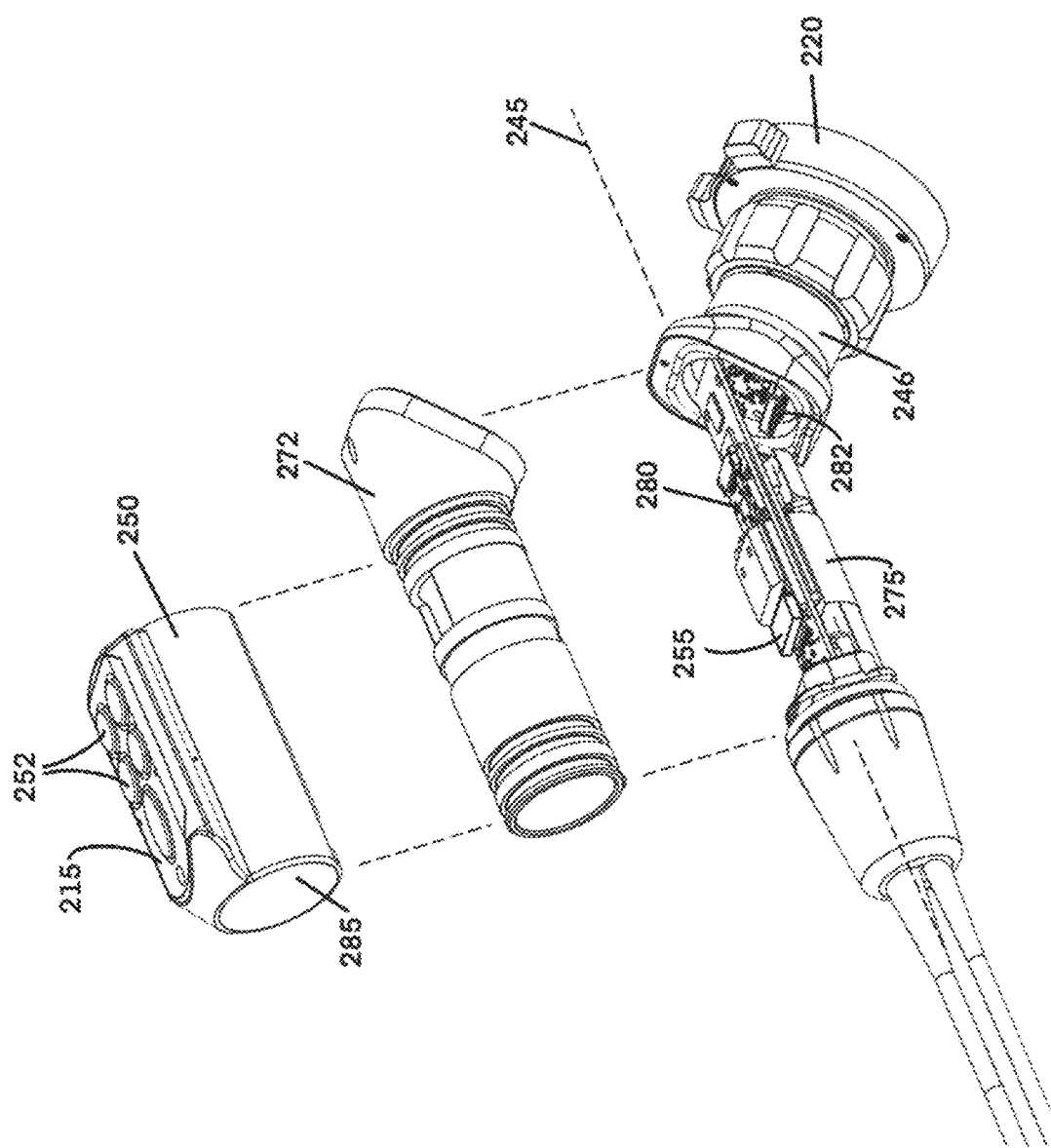
FIG. 7 is a perspective view partly disassembled view of the handle of FIG. 5, showing the accelerometer position on a non-rotating circuit board with the rotating control pad and non-rotating handle housing in an exploded view.

Now turning FIG. 7, an exploded view of the handle component 200 is shown where the control pad 215 and rotating sleeve 250 are shown separated from the non-rotating housing 272 of the handle 200, which is also separated from the core 275 of the handle 200. In FIG. 7, the accelerometer 255 can be seen mounted on circuit board 280 carried in the interior of the handle component 200. The circuit board 280 extends distally within an interior of the handle 200 to an angled circuit board portion 282, which is adapted to carry the image sensor 225 (see FIG. 5). In FIG. 7, it can be understood that the core 275 is configured with conductive electrical contacts that protrude through the non-rotating housing and are adapted to contact annular electrical contacts or traces on the interior of the rotating sleeve 250 so that control pad 215 can rotate 360° while at all times maintaining electrical contact between the control pad 215 and the circuit board 280. In a variation, the annular electrical contacts on the interior of the rotating sleeve 250 are exposed conductive traces on a flex circuit that is formed into a loop and routed along the interior cylindrical surface of the rotating sleeve 250. The core 275 carries spring-loaded or pogo contacts to interface with the conductive traces. It should be appreciated that multiple additional O-rings or other seals can be provided between the components in FIG. 7 and are not shown for convenience. With suitable O-rings or other seals between the components, the device can be configured for sterilization by autoclaving or other suitable sterilization methods. One aspect of the invention is providing a rotatable set of buttons that is sealed so that it can be autoclaved or sterilized by other suitable means.

Figure 8:
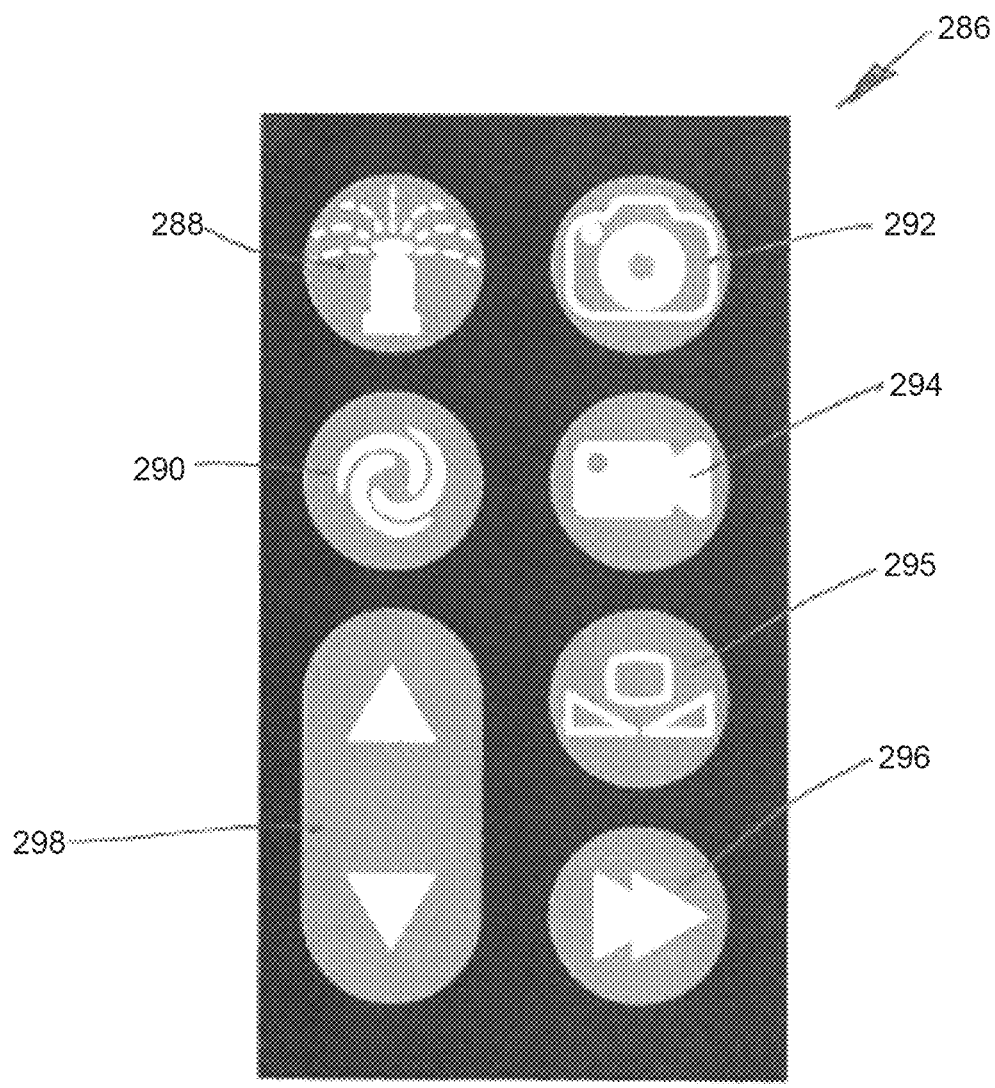
FIG. 8 is a schematic view of a variation of a control pad carried on the handle of FIG. 5.

FIG. 8 shows a variation of a control pad 286 carried by the rotating sleeve 250 of FIG. 7, which includes several buttons, including an irrigation button 288, a flush button 290, a camera still shot button 292, a video button 294, a white balance button 295, a toggle forward button 296 and an up-down adjustment button 298 for adjusting a selected parameter up and down such as set pressure, fluid deficit limit, or irrigation flow rate.

Figure 9:
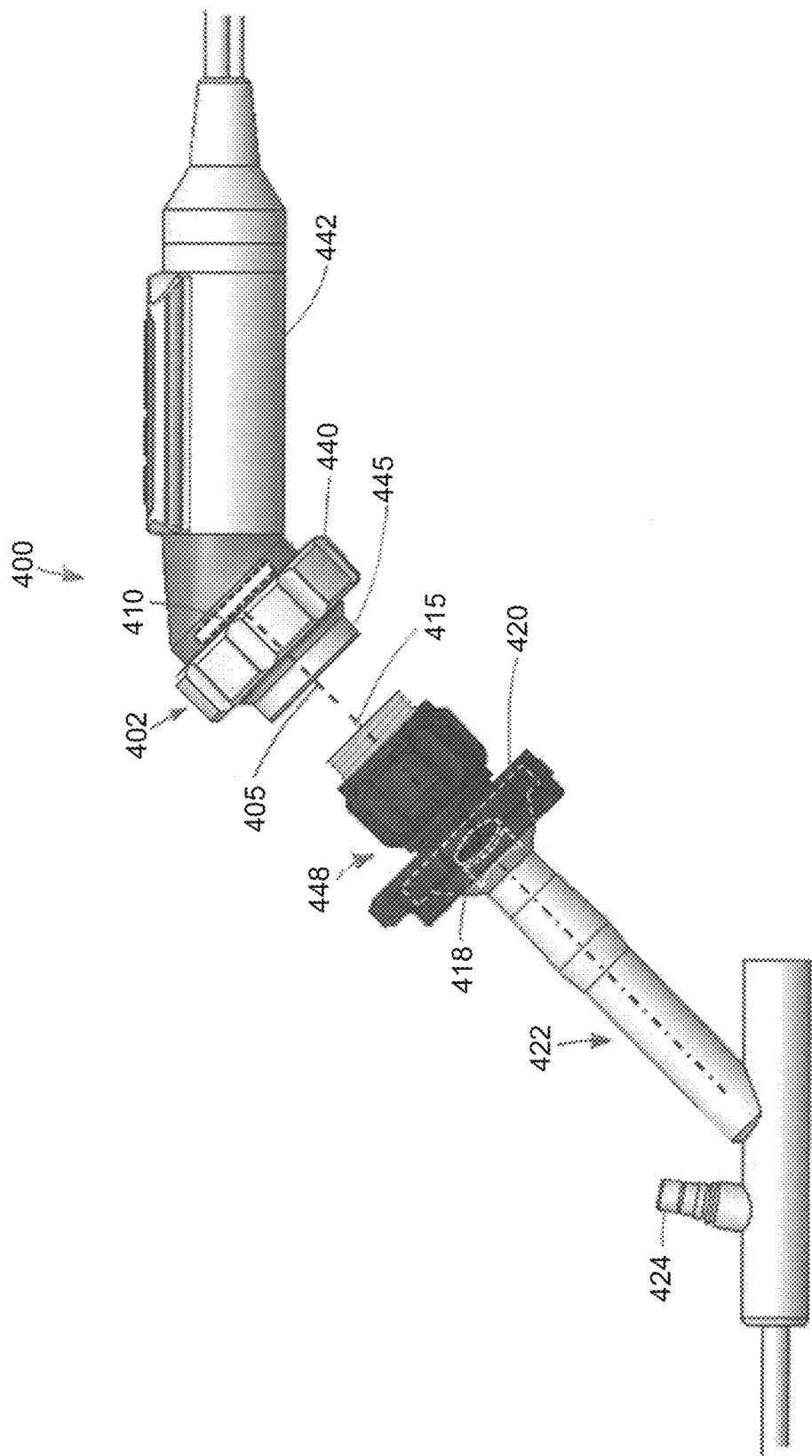
FIG. 9 is an elevational view of another variation of an endoscope coupling device that includes an adjustment mechanism assembly for adjusting the optical axis of a second housing component of the device that couples to an endoscope relative to a first housing assembly of the device that carries the image sensor.
Figure 10:
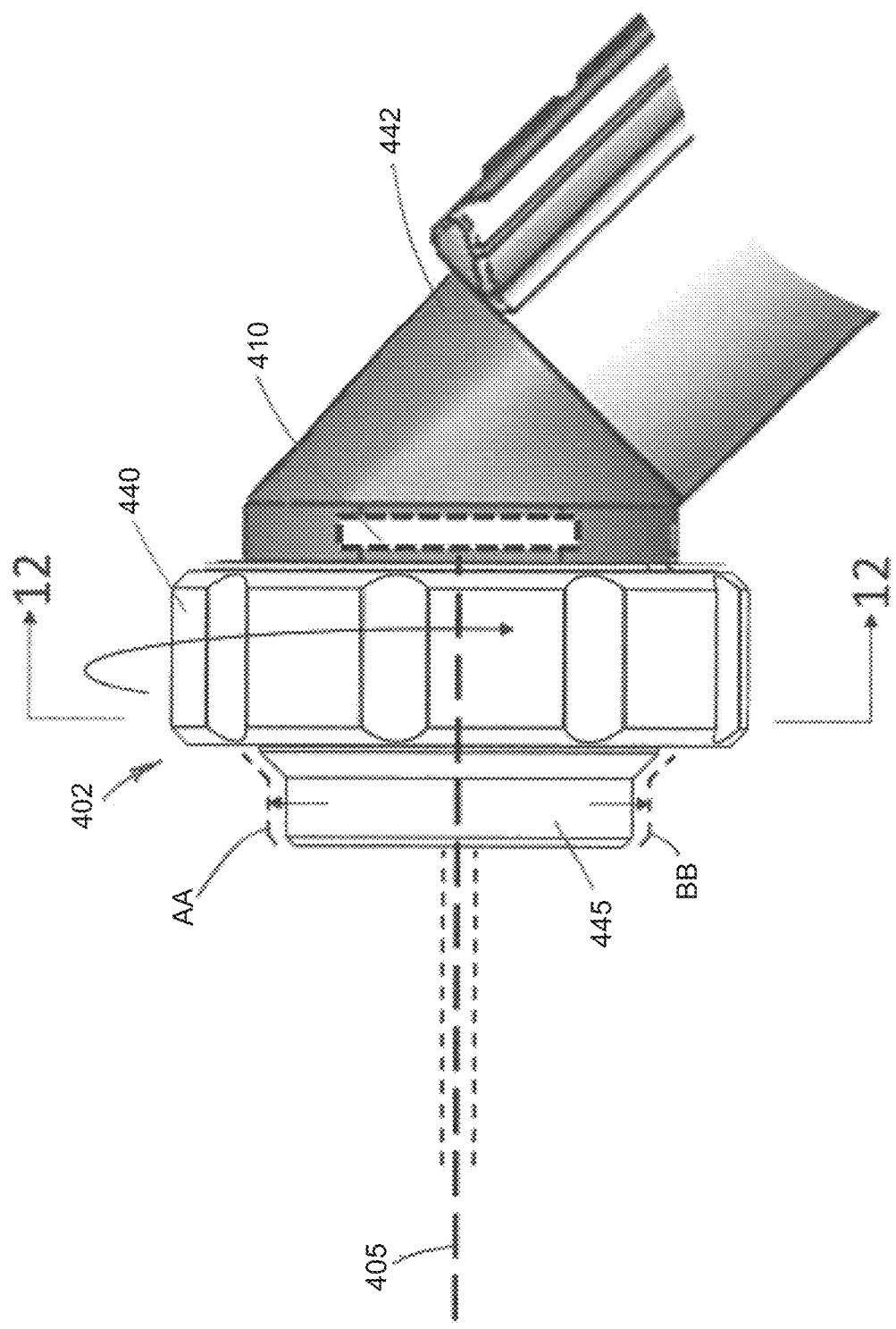
FIG. 10 is an elevational view of a rotatable first housing or grip housing of the coupling device of FIG. 9, showing a range of transverse motion of the second housing relative to the first grip housing.
Figure 11A:
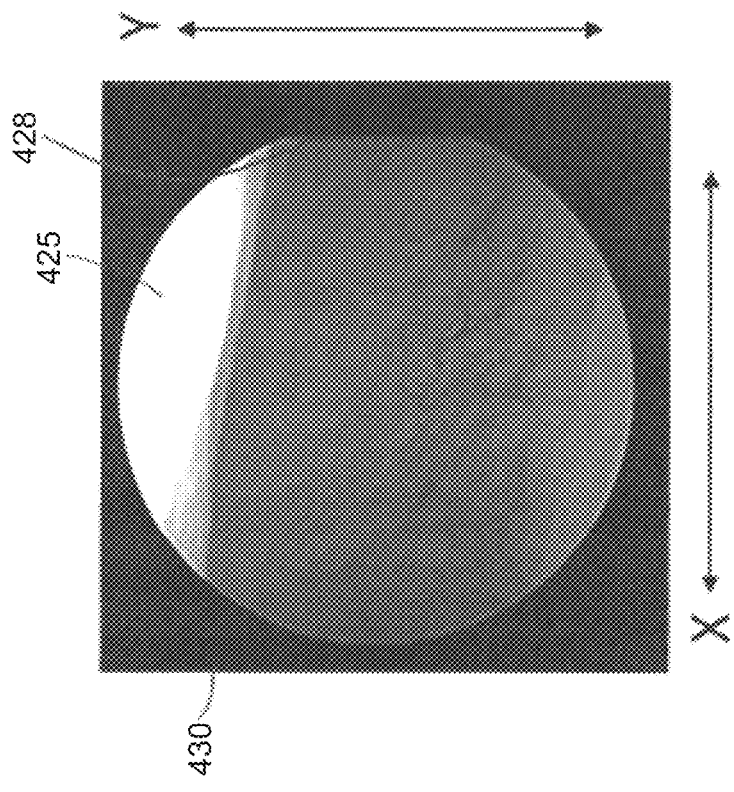
FIG. 11A is a schematic view of a display or screen showing an image from an endoscope and the camera coupling device of FIG. 9 where the image is cropped due to misalignment of the eyepiece and lens of the endoscope with the optical axis of the image sensor in the camera coupling device.
Figure 11B:
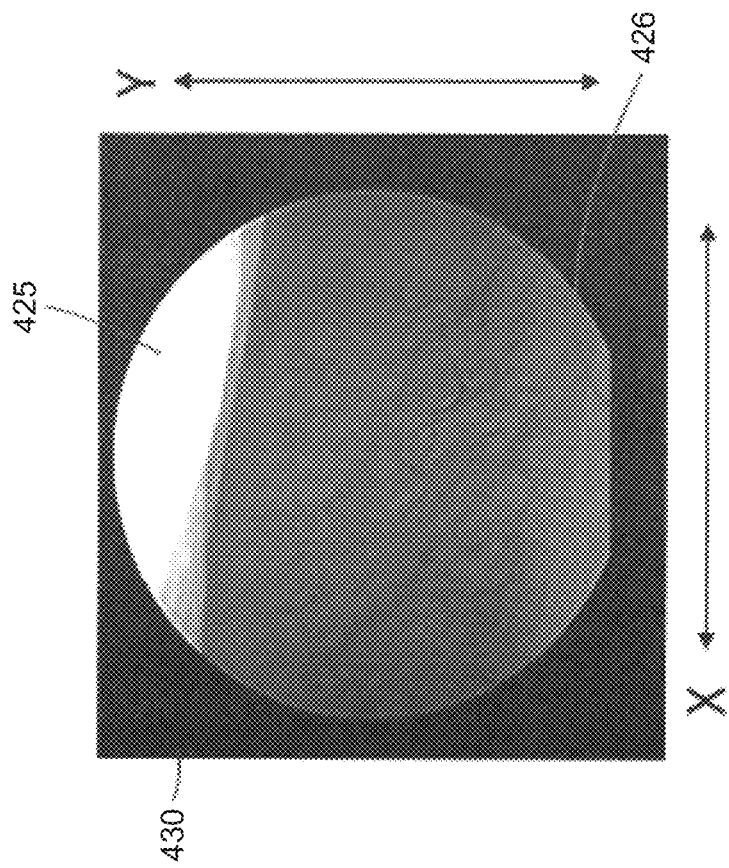
FIG. 11B is a schematic view as in FIG. 10A, wherein the image is cropped in a different direction.

FIGS. 9 and 10 illustrate another variation of a camera-to-endoscope coupling device 400 that is similar to the camera coupling device or handle 200 of FIGS. 5 and 6A-6B. The camera coupling device 400 of FIGS. 9 and 10 differs in that it includes an additional adjustment mechanism assembly 402 for adjusting the alignment of the optical axis 405 of the image sensor 410 of the camera coupling device 400 relative to the optical axis 415 of the lens 418 in the eyepiece 420 of a conventional rigid endoscope 422 when coupled to device 400 as shown in FIG. 9. The endoscope 422 is configured with a light post 424. When using the camera coupling device 400 of FIG. 9, it has been found that commercially available endoscopes may have an optical axis 415 in the eyepiece 420 that varies slightly in position relative to edges of the eyepiece 420. Such a misalignment can result from variations in manufacturing of such an endoscope 422. When an endoscope 422 with a misalignment is coupled to the device 400 of FIG. 9, it can cause cropping of an edge of the image 425 on a display 430 as shown in FIGS. 11A and 11B, where the images have an X-axis and a Y-axis. In other words, the image projection from the endoscope 422 may not be precisely aligned with the central axis 405 of the image sensor 410 in device 400. In FIG. 11A, the image has a cropped portion 426 at the bottom such that a Y-axis adjustment is needed. FIG. 11B shows an image that is cropped portion 428 on the right so that an X-axis adjustment is needed.

Referring to FIG. 9, the camera coupling device 400 has a first grip housing 440 that rotates on the handle housing 442 that carries the image sensor 410 in a fixed position. The camera coupling device 400 has a second housing 445 that is adapted for threaded attachment to a C-mount optical coupler 448 of FIG. 9. Such a C-mount optical coupler 448 is known in the art and is adapted for detachable locking onto the eyepiece 420 of the endoscope 422, as shown in FIG. 9.

Figure 12:
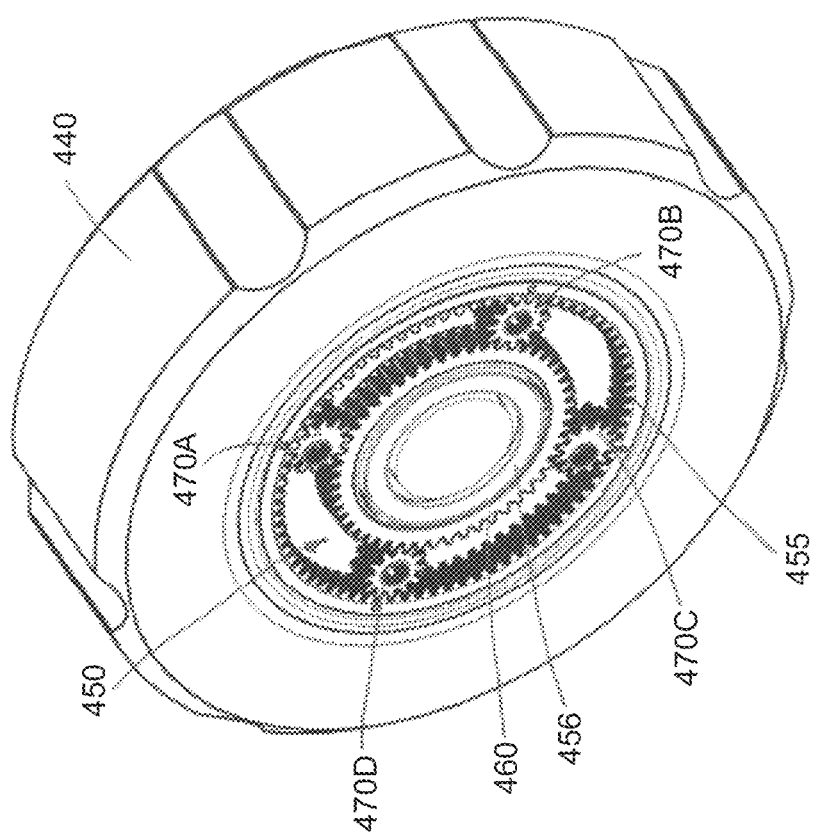
FIG. 12 is a sectional view taken along line 12-12 of FIG. 10 showing a planetary gear set that is configured for adjusting the central axis of the C-mount coupler and second housing relative to first grip housing and optical axis of the image sensor.

The adjustment mechanism assembly 402 of the camera coupling device 400 of FIGS. 9 and 10 is adapted to move the second housing 445 relative to the first grip housing 440 to correct for misalignment of the optical axis 415 of the endoscope lens 418 with the optical axis 405 of the image sensor 410. In FIG. 10, the dashed lines AA and BB indicate the possible movement of the second housing 445 of the device 400 in two directions relative to the first grip housing 440, but as will be described below, the second housing 445 can be moved in any direction relative to the first grip housing 440. The grip housing 440 can be rotated 360° to actuate a planetary gear mechanism 450, as shown in FIG. 12 and described in more detail below, to adjust the axis-transverse position of the second housing 445 relative to the first grip housing 440. To understand the planetary gear mechanism 450, the components of device 400 are shown in the exploded views of FIGS. 13 and 14.

Figure 13:
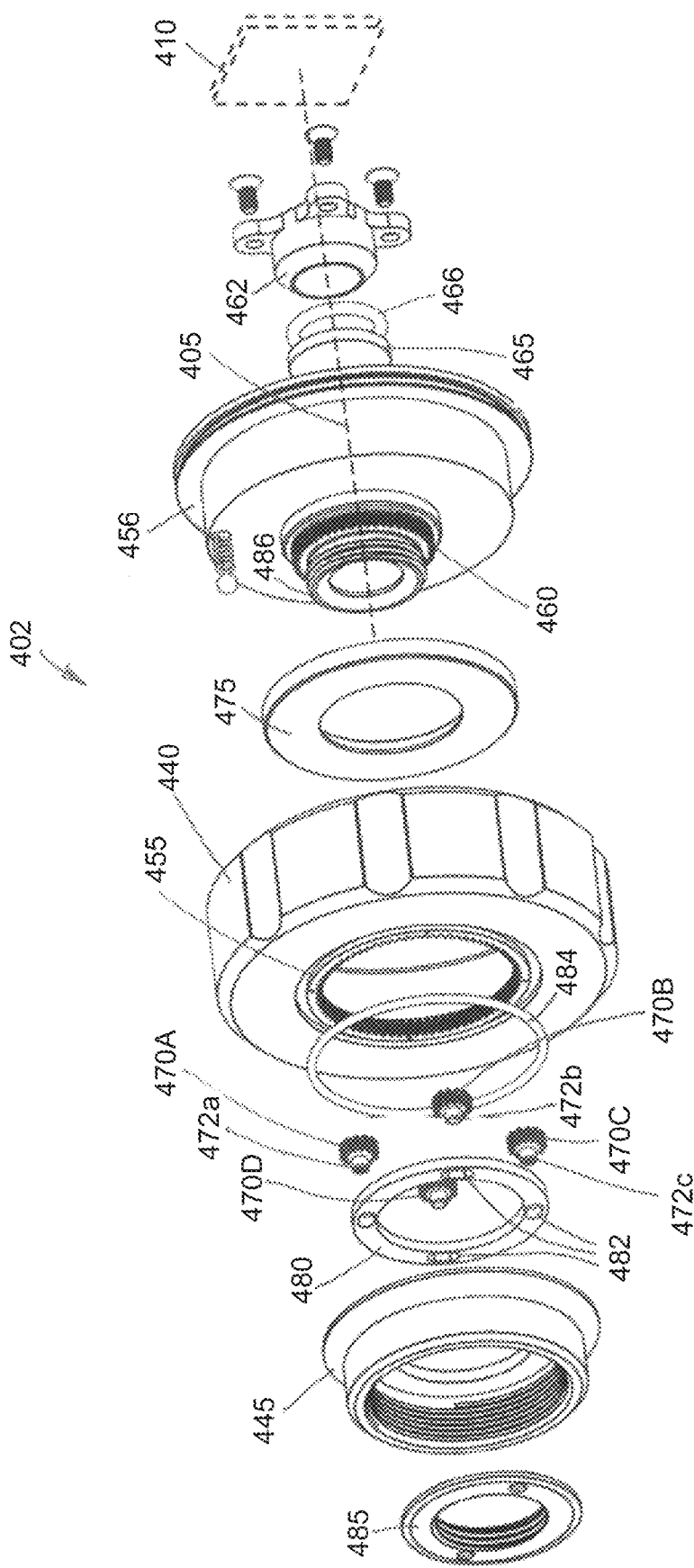
FIG. 13 is an exploded perspective view of the components of the adjustment mechanism assembly of FIG. 10.

Referring now to FIGS. 12 and 13, it can be seen that the rotatable first grip housing 440 carries an outer ring gear 455 of the planetary gear set 450. The base housing 456 (see FIGS. 12 and 13) carries a sun gear 460 of the planetary gear set 450, which is a non-rotatable fixed component of the base housing 456. The lens cover 462 is adapted for locking a sapphire window or lens 465 and O-ring 466 in place within the base housing 456, which is aligned with the optical axis 405 of the image sensor 410 (FIG. 13). The planetary gear set 450 further comprises four planet gears 470A-470D shown in FIGS. 12 and 13. As can be understood from FIG. 12, the rotatable grip housing 440 and its outer ring gear 455 drive the planet gears 470A-470D around the sun gear 460. Further, each planet gear 470A-470D is configured with a respective distally-projecting gear post 472$a$-472$d$ fixed thereto, as can be seen in FIGS. 13-15.

Returning to the exploded view of FIG. 13, the device 400 further includes a thrust bearing 475 with a distal flat surface 476 that interfaces with the proximal flat surfaces 477 of the planet gears 470A-470D to maintain the gears in place and reduce friction. FIG. 13 further shows an offset ring 480 with four elongate slots 482 therein that receive the distally-projecting gear posts 472$a$-472$d$ of the planet gears 470A-470D. As will be described below, the planetary gear set 450 (see FIGS. 13-14) is configured to move the offset ring 480 non-concentrically or sideways relative to axis 405 to thereby move the second housing 445 transversely or sideways relative to the first grip housing 440 as shown in FIG. 10. FIG. 13 also shows an O-ring 484 that provides a seal between first grip housing 440 and second housing 445. A retainer plate 485 also is shown in FIG. 13, which is coupled to a threaded portion 486 of the base housing 456 to lock together all the components of the device 400 shown in FIG. 13. It should be appreciated that multiple additional O-rings or other seals can be provided between the components in FIG. 13 and are not shown for convenience. With suitable O-rings or other seals between the components, the device 400 can be configured for sterilization by autoclaving or other suitable sterilization methods. One aspect of the invention is providing a sealed adjustment mechanism in a camera coupling device 400 that can be autoclaved or sterilized by other suitable means.

Figure 14:
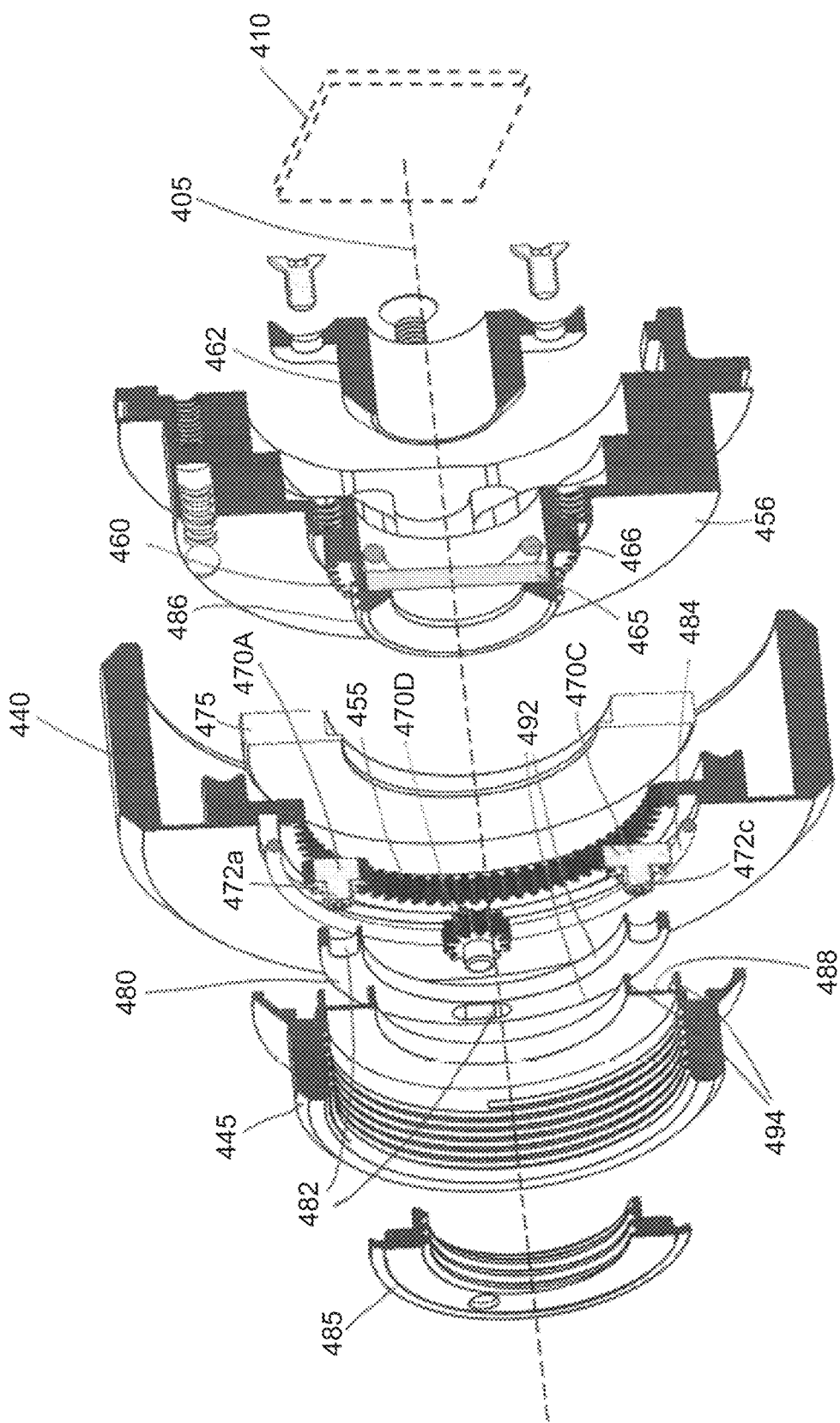
FIG. 14 is an exploded sectional view of the components of the adjustment mechanism assembly of FIG. 13.
Figure 15B:
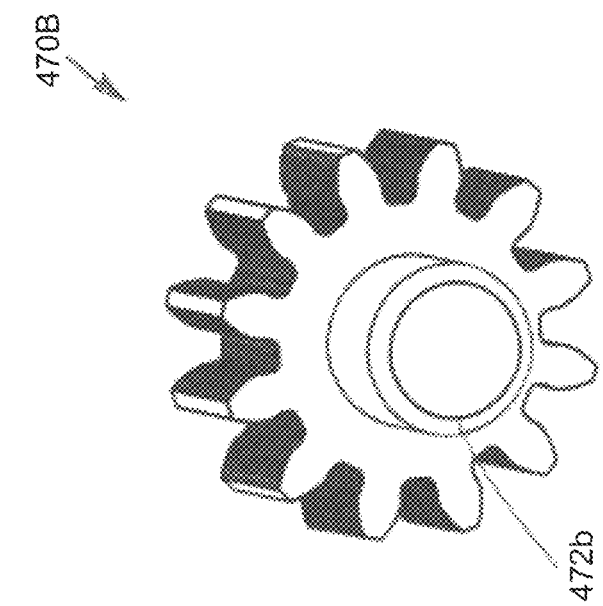
FIG. 15B is an enlarged perspective view of a concentric planet gear of the planetary gear set that carries an on-center post fixed thereto.
Figure 15A:
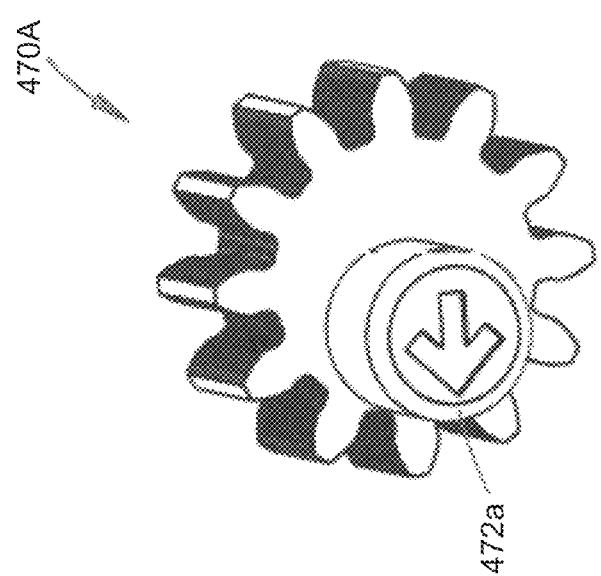
FIG. 15A is an enlarged perspective view of an eccentric planet gear of the planetary gear set that carries an off-center post fixed thereto.

Now turning to FIGS. 12, 14, 15A-15B, and 16A-16B, it can be seen how the planetary gear set of FIG. 12 can offset the second housing 445 transversely or sideways from axis 405 extending through the optical center 490 of the first grip housing 440. In FIGS. 12 and 14, it can be understood that rotation of the first grip housing 440 and outer ring gear 455 is concentric with axis 405 of device 400 and rotates all planet gears 470A-470D. Thus, rotation of the planet gears 470A-470D drives the motion of the second housing 445 via the offset ring 480. As described above, each of the planet gears 470A-470D has its respective projecting gear post 472$a$-472$c$, which is received by a corresponding elongate slot 482 in the offset ring 480. As can be seen in the sectional view of FIG. 14, the offset ring 480 is received by annular recess 488 in the second housing 445. As the planet gears 470A-470D, rotate, the projecting posts 472$a$-472$c$ fixed to the gears 470A-470D also rotate. In the variation of FIGS. 12-14, there are four planet gears 470A-470D wherein two planet gears 470A and 470C are configured with off-center posts 472$a$ and 472$c$, which are off-center to the rotational axis of each gear 470A and 470C and hereafter can be identified as eccentric gears. An enlarged view of planet gear 470A with off-center post 472$a$ is shown in FIG. 15A. The planet gears 470B, and 470D are configured with on-center or concentric posts 472$b$ and 472$d$. An enlarged view of planet gear 470B with on-center post 472$b$ is shown in FIG. 15B. As can be understood from FIGS. 16A and 16B, the off-center posts 472$a$ and 472$c$ of eccentric gears 470A and 470C can move the offset ring 480 sideways or offset from axis 405 of the image sensor 410. At the same time, the concentric gear posts 472$b$ and 472$d$ of gears 470B and 470D constrain motion of the offset ring 480. In FIG. 16A, the four planet gears 470A-470D are rotationally oriented such that the projecting gear posts 472$a$-472$d$ are slidably positioned in elongate slots 482 such that the optical center 490 of the grip housing 440 is aligned with the optical center 495 of the second housing 445. In FIG. 16B, it can be understood that rotation of the grip housing 440 and outer ring gear 455 (see FIG. 12) rotates and drives the planet gears 470A-470D so that the eccentric gear posts 472$a$ and 472$c$ push outwardly on the sides of corresponding elongate slots 482 of offset ring 480 to thus move the offset ring transversely such that the optical center 495 of second housing 445 is offset outwardly from the optical center 490 of the grip housing 440 and axis 405 of image sensor 410. As described above, the inner and outer surfaces 492 of the offset ring 480 are slidably received by cooperating surfaces 494 of annular recess 488 in the second housing 445. Thus, sideways or axis-transverse movement of the offset ring 480 will cause the same sideways or transverse movement of the second housing 445 relative to axis 405 of the device 400, as depicted in FIG. 10. Thus, the movement of the offset ring 480 as shown in FIGS. 16A-16B can be used to adjust the position of the second housing 445 to align the endoscope optical axis 415 with the image sensor axis 405 while viewing the display 430 as shown in FIGS. 11A-11B.

In general, the rotation of the planetary gear set 450 causes motion of the optical center 495 of the second housing 445, which transcribes a centered trochoid. In geometry, a centered trochoid is described as a path formed by a circle rolling along inside another circle and, more particularly, a path traced by a point attached to a circle as the circle rolls without slipping along another fixed circle. In this variation, the centered trochoid can be adjusted to make finer or more coarse movements by the gear ratios in the planetary gear set 450. In one variation, the planetary gear set 450 is adapted to correct for misalignment within a 1.2 mm diameter circle, but it should be appreciated that the gear set 450 can be customized to allow for greater or lesser misalignment correction. The greater the offset distance of the eccentric gear's post, the larger the diameter of the circle inscribed by the trochoid, and thus the larger correction that can be achieved.

In the variation shown in FIGS. 9-16B, four planet gears 470A-470D are shown with two gears being eccentric gears, but it should be appreciated that variations of the invention can use any number of planet gears with at least one planet gear having an off-center post to provide the adjustment mechanism as described above.

In another aspect of the invention, it can be seen that the planetary gear set 450 has a very small form factor and is less than 10 millimeters and often less than 8 millimeters in axial dimension relative to optical axis 405 of the image sensor 405 and device 400 as can be understood from FIGS. 9 and 10.

Figure 17:
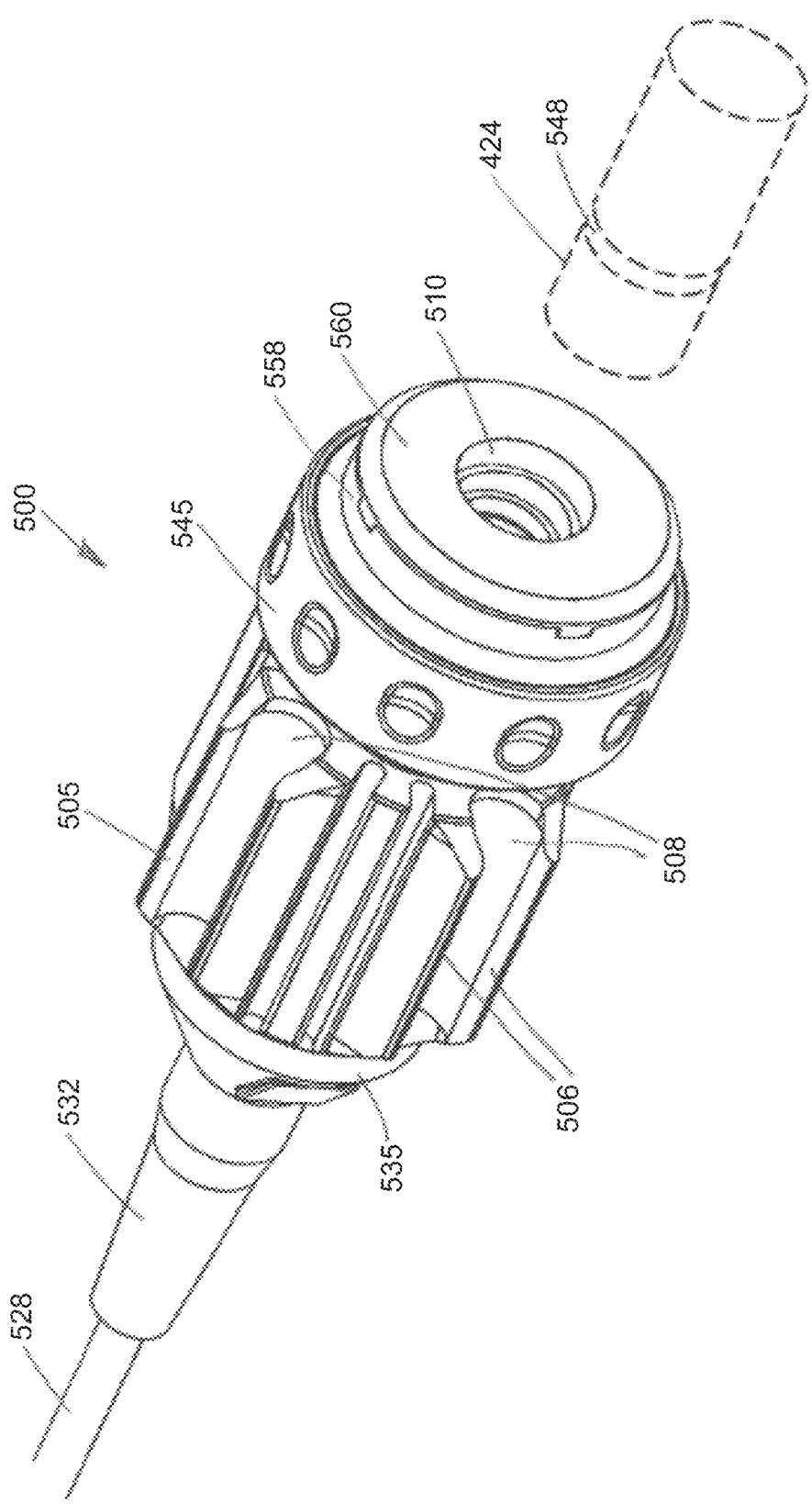
FIG. 17 is a perspective view of a light post coupler of the system that carries a light source and lens that couples to a light post of a conventional rigid endoscope.
Figure 18:
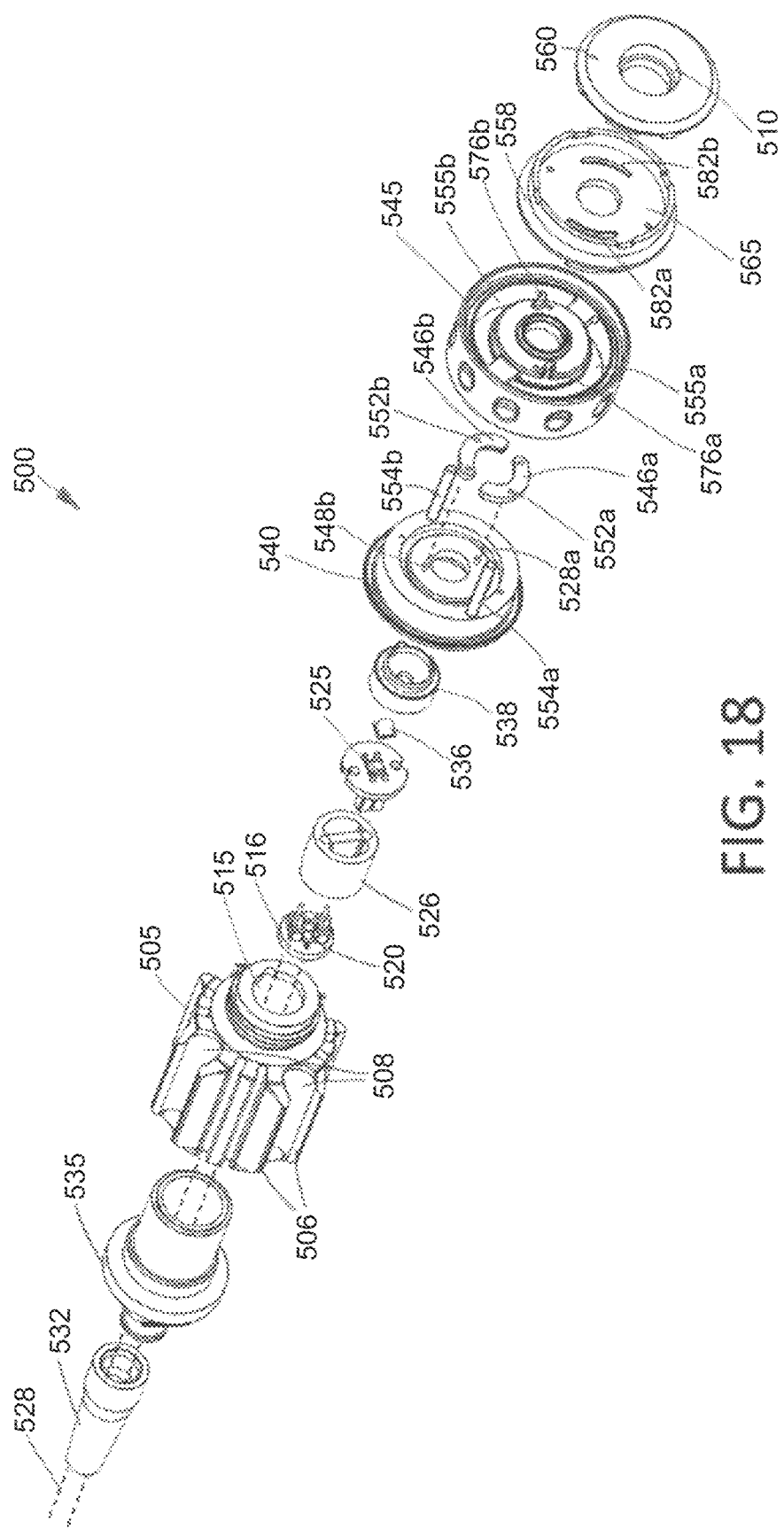
FIG. 18 is an exploded view of the light post coupler of FIG. 17 showing the various components thereof.

FIG. 17 illustrates another variation of a light post coupler 500 of the invention. In FIG. 5 above, a light coupler 260 was described that carried at least one LED and a lens for coupling to the light post 424 of a commercially available endoscope 422, as shown in FIG. 9. In the variation of FIGS. 17-18, the coupler 500 again has an LED component and a locking mechanism for locking the coupler onto the light post 424 of an endoscope. Additionally, the cylindrical main housing 505 of the coupler 500 is configured with a plurality of projecting elements or fins 506 and channels 508 that function as cooling fins and for other purposes described below.

As can be seen in FIGS. 17 and 18, the light coupler 500 has a distal receiving passageway 510 that receives the light post 424 of an endoscope. The features of the LED coupler 500 can be understood with reference to FIG. 18, which is an exploded view of the components of the coupler 500 of FIG. 17. In FIG. 18, the main body 505 has a central passageway 515, which houses a circuit board member 516 that carries an accelerometer 520. The central passageway 515 further carries an LED 525 and a heat sink element 526 adjacent to the LED 525. An electrical cable 528 extends through a flexible stress relief member 532 and proximal housing cap 535 to connect electrical leads to the accelerometer 520 and LED 525. A lens 536 is positioned distal to the LED and is held in position by a lens holder 538. A lock housing 540 maintains the lens holder 538 in place. A rotatable grip 545 is positioned on the distal side of the lock housing 540. As can be seen in FIG. 18, a pair of locking arms 546a and 546b are provided that pivot around pivot pins 548a and 548b. It can be understood how the locking arms 546a and 546b pivot to cause arm portions to move inward and outward to lock and unlock in a circumferential groove 548 in the light post 424 of an endoscope (FIG. 17). The proximal side of the rotatable grip 545 has pins (not visible) that engage central holes 552a, 552b in the locking arms to actuate the locking arms 546a and 546b. Dowel pins 554a and 554b extend from the lock housing 540 through partly annular openings 555a and 555b in the rotatable grip 545 to engage an end plate 558 to hold the assembly together. Finally, an end cap 560 is provided to cover a shutter space 565 (described further below) between the end plate 558 and the end cap 560. Springs (not visible) are connected between the proximal face of rotatable grip 545 and the lock housing 540 and are adapted to urge the grip 545 and locking arms 546a and 546b to a closed or locking position as is known in the art. In the exploded view of FIG. 18, it should be appreciated that various seals and O-rings (not shown) may be provided between the components to seal the interior components and allow the coupler to be sterilized by an autoclave or other sterilization means. Such seals and O-rings are not shown for convenience.

As can be understood from the above descriptions of the camera coupling devices 200 and 400 of FIGS. 5 and 9, respectively, and the light coupler 500 of FIGS. 17-18, each component carries an accelerometer (255 in FIGS. 5 and 7; 520 in FIG. 18). In one aspect of the invention, both accelerometers 255 and 520 send signals to a controller and image processor, which provide orientation signals that when processed allow for very precise upright image stabilization that may not be possible with a single accelerometer 255 in the camera coupling device 200 as shown in FIG. 5. Thus, a method of the invention comprises providing a camera coupler (200, 400) with a first accelerometer and a second spaced apart component with a second accelerometer, such as light coupler 500 of FIGS. 17-18, and processing signals from the first and second accelerometers to stabilize an endoscopic image on a video display.

Now referring back to FIG. 17, the plurality of projecting elements 506 and channels 508 in the main housing 505 are adapted to perform multiple functions. First, the main housing 505 is formed of a thermally conductive material (e.g., aluminum), and the projecting elements 506 and channels 508 function as heat exchange fins to provide heat dissipation which is provided by the increased surface area of fin elements 506 in the housing 505 that are exposed to air. It has been found that continuous operation of the LED 525 can cause unwanted heating of the main housing 505 and coupler 500. Thus, the projecting elements 506 functioning as cooling fins can significantly dissipate heat from the coupler 500. While the variation of FIG. 17 shows projecting features 506 and channels 508 that have an axial configuration. It should be appreciated that radial or helical fins or other shapes of heat dissipation elements may be suitable for the coupler 500.

Referring to FIG. 17, the channels 508 between some of the projecting features 506 provide a second function and are configured to receive and lock in place a portion of a flexible cable or flexible tubing. In a variation, a flexible tubing set may carry a cooling fluid or other cooling medium to transfer heat away from the housing 505 to provide additional cooling. Thus, it can be seen that some fins or elements 506 have lips 558 on the edges of a channel 508 so that a cable or tubing can be pressed into and captured by the channel 508. It has been found that such channels also can be useful for managing electrical cables in surgical suite. Portions of one or more cables can be locked into a channel 508 of the coupler 500 for convenience.

Figure 19:
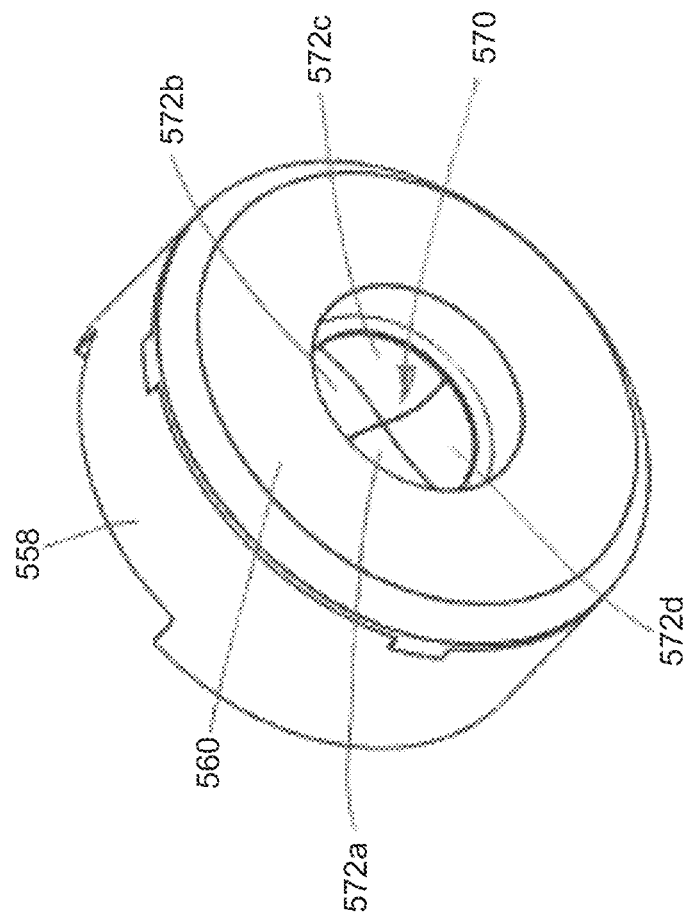
FIG. 19 is a perspective view of an endplate assembly of a variation or the light post coupler of FIG. 17 showing a four-leaf shutter mechanism.
Figure 20:
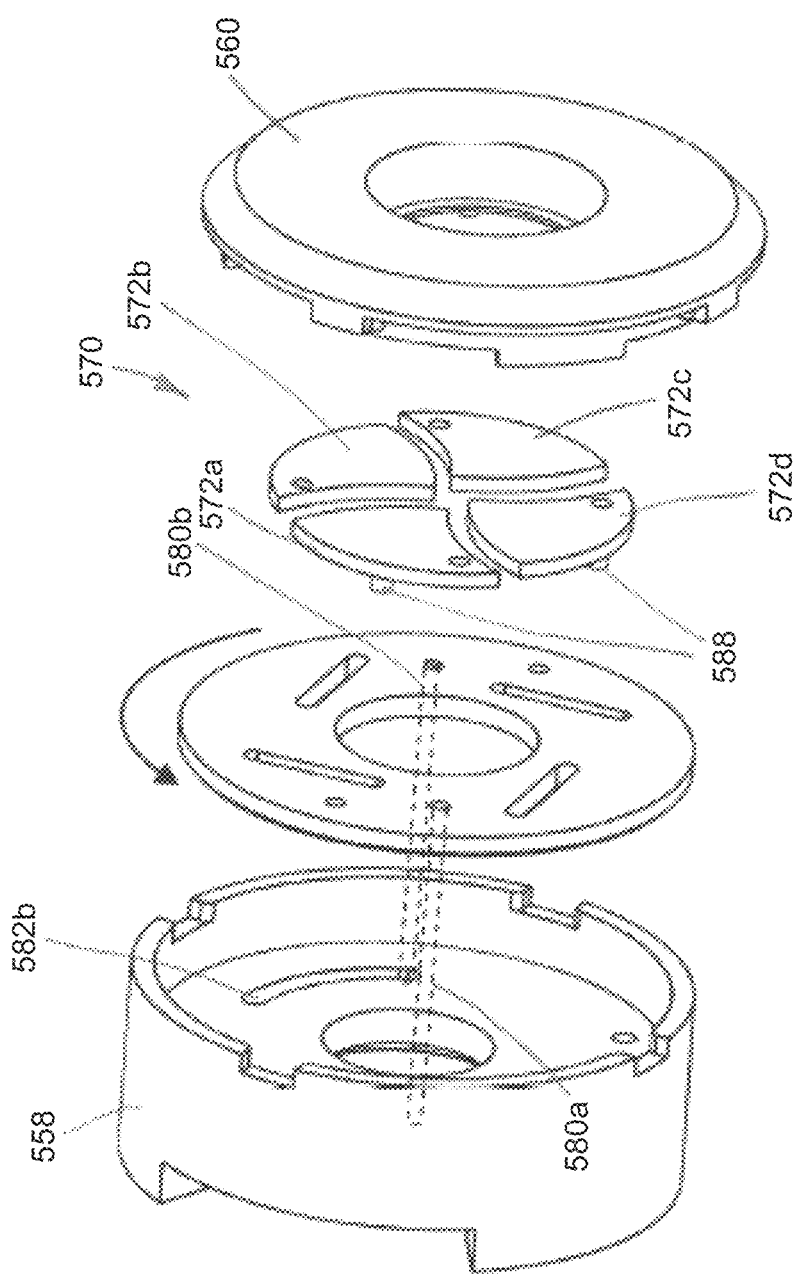
FIG. 20 is an exploded view of the endplate assembly of FIG. 19 showing the four-leaf shutter mechanism.

In another aspect of the invention, the light coupler 500 shown in the exploded view of FIG. 18 provides a shutter-receiving space 565, described above, between the end plate 558 and end cap 560 for receiving a shutter mechanism 570. FIGS. 19 and 20 illustrate a suitable shutter mechanism 570, which comprises a four-leaf shutter adapted for protecting the lens 536 from debris and contamination when not in use. In FIG. 19, the shutter is in a closed position. In the exploded view of FIG. 20, each shutter leaf 572a-572d is shown separated from one another. For clarity, FIGS. 19 and 20 show only the endplate 558 and end cap 560 of FIG. 18, and it can be seen in FIG. 18 that the rotating grip 545 is configured with dowel holders 576a and 576b, which hold the elongated shutter dowel pins 580a and 580b of FIG. 19 (phantom view).

Thus, referring to FIGS. 18 and 20, rotating the grip 545 causes angular movement of elongated dowel pins 580*a* and 580*b* that extend through arcuate slots 582*a* and 582*b* in the end plate 558, which in turn rotates the shutter plate 585. As can be understood from FIG. 19, rotation of the shutter plate 585 actuates each leaf 572*a*-572*d* of the shutter mechanism 570. Each shutter leaf 572*a*-572*d* rotates around a respective pin (not visible) in the end cap 560. Each leaf 577*a*-572*d* further is configured with a respective proximal-facing pin 588 (only two pins visible) that slides in slots 590 in the shutter actuator plate 585. Thus, it can be understood how manual rotation of the grip 545 (FIG. 18) can open and close the four-leaf shutter mechanism 570 between closed and open positions.

Referring to FIG. 18, the grip 545 can be rotated from about 30° to 90° degrees to close and open the shutter mechanism 570 and contemporaneously engage and disengage the locking members 546*a*, 546*b* to the light post 424. In the variation shown in FIGS. 17-20, the shutter mechanism 570 and locking mechanism are mechanically linked to operate simultaneously with movement the rotating grip 545.

In another variation, a first rotatable grip can actuate the shutter mechanism 570 alone, and a second rotatable grip can actuate the locking mechanism to lock the coupler 500 to a light post 424 of an endoscope. It should be appreciated that an independent mechanism may be useful for certain types of light posts, and the scope of the invention includes any variation of combination or independent shutter and the locking mechanisms.

In another variation, the locking mechanism and shutter mechanism can be carried in an endplate 558 and end cap 560 assembly that is detachable from the main housing 505 that carries the LED 525 and lens 536 wherein such an endplate assembly can be connected by a threaded fitting. Such a variation allows for improved access to the LED 525 and/or lens 536 and improves the ability to clean the lens or perform any task where access to the LED 525 or lens 536 is required. Additionally, this allows for replacing the locking mechanism and shutter mechanism in the case of failure without replacing the main body 505 carrying the LED 525 or if a new locking mechanism or shutter is required to accept other light post designs.

Although particular embodiments of the present invention have been described above in detail, it will be understood that this description is merely for purposes of illustration and the above description of the invention is not exhaustive. Specific features of the invention are shown in some drawings and not in others, and this is for convenience only, and any feature may be combined with another in accordance with the invention. A number of variations and alternatives will be apparent to one having ordinary skills in the art. Such alternatives and variations are intended to be included within the scope of the claims. Particular features that are presented in dependent claims can be combined and fall within the scope of the invention. The invention also encompasses embodiments as if dependent claims were alternatively written in a multiple dependent claim format with reference to other independent claims.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

All references, including publications, patent applications, and patents, cited herein are hereby incorporated by reference to the same extent as if each reference were individually and specifically indicated to be incorporated by reference and were set forth in its entirety herein.

What is claimed is:

1. An endoscope coupling device comprising:
    a coupler configured for coupling to an eyepiece of an endoscope, wherein the coupler includes a first housing and a second housing;
    an image sensor carried in the coupler; and
    an alignment mechanism in the coupler adapted to adjust alignment of an optical axis of a lens in the eyepiece relative to an optical axis of the image sensor, wherein the alignment mechanism comprises a planetary gear assembly, wherein the planetary gear assembly is adapted to move the second housing transversely relative to an optical axis of the image sensor.

2. The endoscope coupling device of claim 1 wherein the planetary gear assembly includes an outer ring gear that engages a plurality of inwardly positioned planet gears.

3. The endoscope coupling device of claim 2 wherein the outer ring gear is carried in a first grip housing that is rotatable relative on the coupler.

4. The endoscope coupling device of claim 3 wherein the planetary gear assembly engages a sun gear that is inwardly positioned.

5. The endoscope coupling device of claim 4 wherein the sun gear is carried in a fixed relationship to the first housing.

6. The endoscope coupling device of claim 2 wherein at least one planet gear of the plurality of inwardly positioned planet gears in the planetary gear assembly has a post projecting transversely from the at least one planet gear.

7. The endoscope coupling device of claim 6 wherein the post of the at least one planet gear of the plurality of inwardly positioned planet gears in the planetary gear assembly is positioned off-center in the at least one planet gear.

8. The endoscope coupling device of claim 6 wherein the post of the at least one planet gear of the plurality of inwardly positioned planet gears in the planetary gear assembly is positioned concentrically in the at least one planet gear.

9. The endoscope coupling device of claim 6 wherein the post of the at least one planet gear of the plurality of inwardly positioned planet gears in the planetary gear assembly is received by an elongated slot in an offset ring.

10. The endoscope coupling device of claim 9 wherein the offset ring is positioned in slidable contact with an annular recess in the second housing.

11. The endoscope coupling device of claim 1 wherein the alignment mechanism is adapted to move the second housing transversely relative to an optical axis of the image sensor by up to 5 mm.

* * * * *